(12) United States Patent
Lee et al.

(10) Patent No.: US 11,722,923 B2
(45) Date of Patent: *Aug. 8, 2023

(54) CANCELLING SL CSI REPORTING IN A WIRELESS COMMUNICATION SYSTEM

(71) Applicant: LG ELECTRONICS INC., Seoul (KR)

(72) Inventors: Youngdae Lee, Seoul (KR); Giwon Park, Seoul (KR); Jongyoul Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/963,596

(22) Filed: Oct. 11, 2022

(65) Prior Publication Data

US 2023/0038207 A1    Feb. 9, 2023

Related U.S. Application Data

(63) Continuation of application No. 17/569,941, filed on Jan. 6, 2022, now Pat. No. 11,503,491, which is a (Continued)

(30) Foreign Application Priority Data

Nov. 7, 2019    (KR) .......................... 10-2019-0142099

(51) Int. Cl.
*H04W 24/10*      (2009.01)
*H04W 76/15*      (2018.01)
*H04W 92/18*      (2009.01)

(52) U.S. Cl.
CPC ........... *H04W 24/10* (2013.01); *H04W 76/15* (2018.02); *H04W 92/18* (2013.01)

(58) Field of Classification Search
CPC ...... H04W 24/10; H04W 76/15; H04W 92/18
See application file for complete search history.

(56) References Cited

U.S. PATENT DOCUMENTS 11,139,920 B2    10/2021    Hahn ....................... H04L 12/18
11,234,145 B2    1/2022    Hahn ....................... H04W 4/40
(Continued)

FOREIGN PATENT DOCUMENTS

CN    109644455    4/2019
EP    3780844 A1   4/2021
(Continued)

OTHER PUBLICATIONS

U.S. Appl. No. 17/569,941, filed Jan. 6, 2022.
(Continued)

*Primary Examiner* — Brian T O Connor
(74) *Attorney, Agent, or Firm* — Dentons US LLP

(57) ABSTRACT

A method and/or an apparatus for cancelling sidelink (SL) channel state information (CSI) reporting in a wireless communication system is provided. A first wireless device establishes a first PC5-Radio Resource Control (RRC) connection with a second wireless device and a second PC5-RRC connection with a third wireless device. A first wireless device triggers the first SL CSI reporting for a first pair of a Source ID for the first wireless device and a Destination ID for the second wireless device, wherein the first pair is corresponding to the first PC5-RRC connection. A first wireless device generates a MAC CE for the first SL CSI reporting. A first wireless device cancels the triggered first SL CSI reporting for the first pair.

20 Claims, 18 Drawing Sheets

Related U.S. Application Data continuation of application No. PCT/KR2020/015494, filed on Nov. 6, 2020.

(56) References Cited

U.S. PATENT DOCUMENTS

| | | | |
|---|---|---|---|
| 11,375,535 B2 | 6/2022 | Lee | H04W 24/10 |
| 11,503,491 B2 * | 11/2022 | Lee | H04W 76/15 |
| 2016/0242048 A1 | 8/2016 | Pelletier et al. | |
| 2020/0229198 A1 | 7/2020 | Kung | H04W 72/042 |
| 2020/0322024 A1 | 10/2020 | Cheng | H04B 17/327 |
| 2020/0351981 A1 | 11/2020 | Kang | H04L 1/1896 |
| 2020/0413348 A1 | 12/2020 | Ryu | H04W 52/383 |
| 2021/0045074 A1 | 2/2021 | Manolakos | H04B 7/0626 |
| 2021/0050888 A1 | 2/2021 | Manolakos | H04B 7/0626 |
| 2021/0083819 A1 | 3/2021 | Taherzadeh Boroujeni | H04L 5/0051 |
| 2021/0083820 A1 | 3/2021 | Gulati | H04L 5/0057 |
| 2021/0143882 A1 | 5/2021 | Sarkis | H04L 1/1822 |
| 2022/0053513 A1 | 2/2022 | Ryu | H04L 1/0026 |
| 2022/0166558 A1 * | 5/2022 | Zhang | H04L 1/1816 |

FOREIGN PATENT DOCUMENTS

| | | |
|---|---|---|
| WO | 2019196690 A1 | 10/2019 |
| WO | WO-2021090248 A1 | 5/2021 |

OTHER PUBLICATIONS

LG Electronics Inc., "[Running CR] Introduction of 5G V2X with NR Sidelink", 3GPP TSG-RAN WG2 Meeting #107bis, Oct. 14-18, 2019, R2-1914000.

Section 5.2.3 of 3GPP TS 36.300 V15.6.0.

Section 5.14.1.1 of 3GPP TS 36.321 V15.7.0.

Huawei et al., Sidelink physical layer procedures for NR V2X, R1-1910059, 3GPP TSG RAN WG1 Meeting #98bis, Chongqing, China, Oct. 8, 2019, sections 2.2, 3.2-3.3.

ZTE et al., Discussion on PHY procedures for sidelink, R1-1910299, 3GPP TSG RAN WG1 Meeting #98bis, Chongqing, China, Oct. 6, 2019, section 3.

Ericsson, Disucssion on NR SL lower layer procedure, R2-1913330, 3GPP TSG-RAN WG2 #107bis, Chongqing, China, Oct. 3, 2019, section 2.2.

* cited by examiner

CANCELLING SL CSI REPORTING IN A WIRELESS COMMUNICATION SYSTEM

CROSS-REFERENCE TO RELATED APPLICATIONS

This application is a Continuation of U.S. patent application Ser. No. 17/569,941, filed Jan. 6, 2022, which is a Continuation of PCT/KR2020/015494, filed on Nov. 6, 2020, which claims priority to Korean Application No. 10-2019-0142099, filed on Nov. 7, 2019 the contents of which are all hereby incorporated by reference herein in their entirety.

BACKGROUND

Technical Field

The present disclosure relates to cancelling sidelink (SL) channel state information (CSI) reporting in a wireless communication system.

Related Art 5G new radio (NR) is a new radio access technology (RAT) developed by 3rd generation partnership project (3GPP) for the 5G (fifth generation) mobile network. It was designed to be the global standard for the air interface of 5G networks. The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G).

SUMMARY

Technical Objects

The Sidelink Channel Status Information (SL CSI) reporting procedure is used to provide a peer UE with sidelink channel status such as CQI and RI.

However, some of the triggered SL CSI reporting procedure are need to be cancelled for saving resources.

Therefore, studies for cancelling SL CSI reporting in a wireless communication system are required.

Technical Solutions

In an aspect, a method performed by a first wireless device in a wireless communication system is provided. A first wireless device establishes a first PC5-Radio Resource Control (RRC) connection with a second wireless device and a second PC5-RRC connection with a third wireless device. A first wireless device triggers the first SL CSI reporting for a first pair of a Source ID for the first wireless device and a Destination ID for the second wireless device, wherein the first pair is corresponding to the first PC5-RRC connection. A first wireless device generates a MAC CE for the first SL CSI reporting. A first wireless device cancels the triggered first SL CSI reporting for the first pair.

In another aspect, an apparatus for implementing the above method is provided.

Technical Effects

The present disclosure can have various advantageous effects.

According to some embodiments of the present disclosure, a wireless device could cancel sidelink (SL) channel state information (CSI) reporting in a wireless communication system efficiently.

For example, a wireless device could save resource by cancelling the SL CSI reporting in a SL CSI reporting procedure.

For example, a wireless communication system could properly provide resource management by cancel sidelink (SL) channel state information (CSI) reporting in a wireless communication system.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
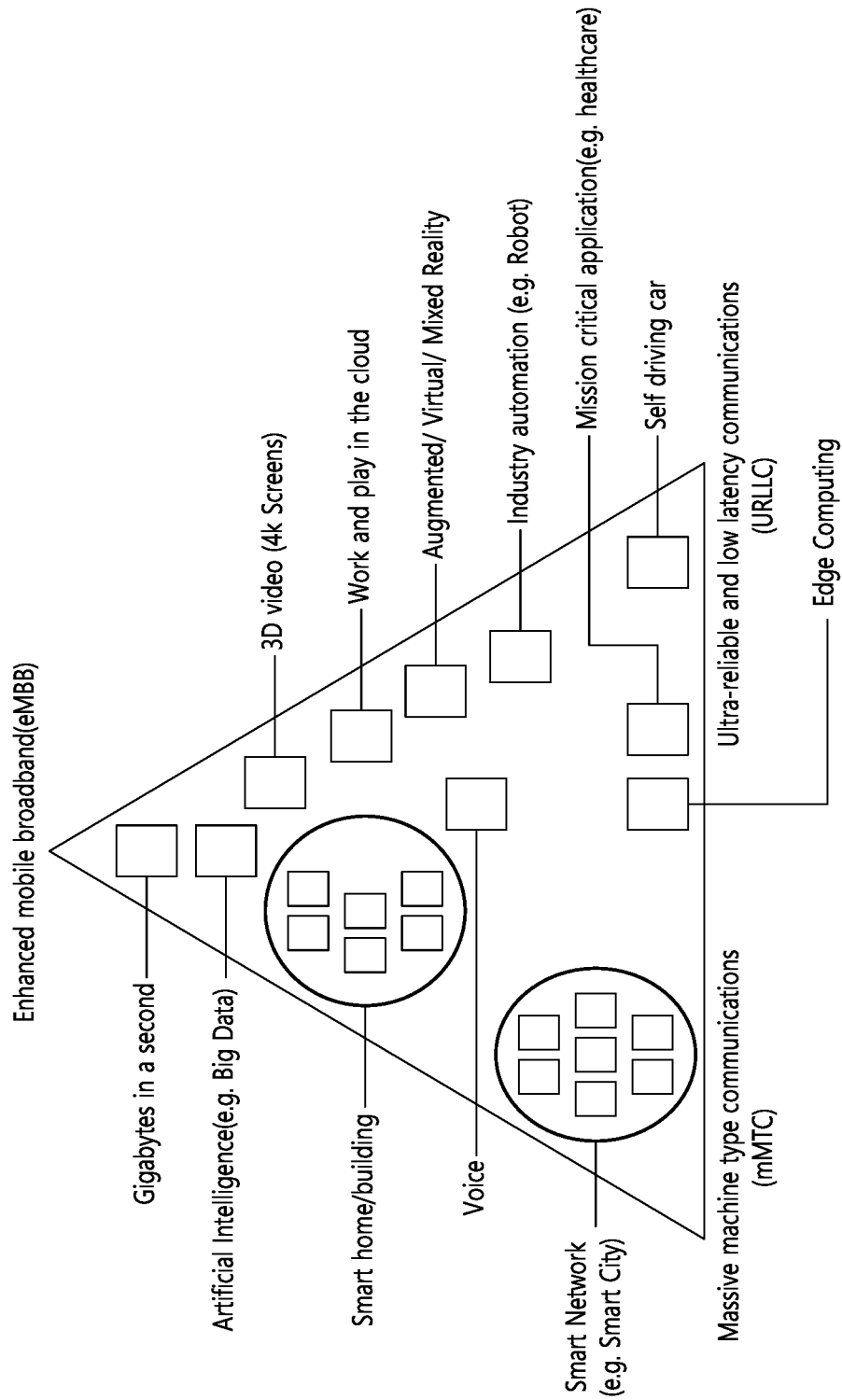
FIG. 1 shows examples of 5G usage scenarios to which the technical features of the present disclosure can be applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B".

Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
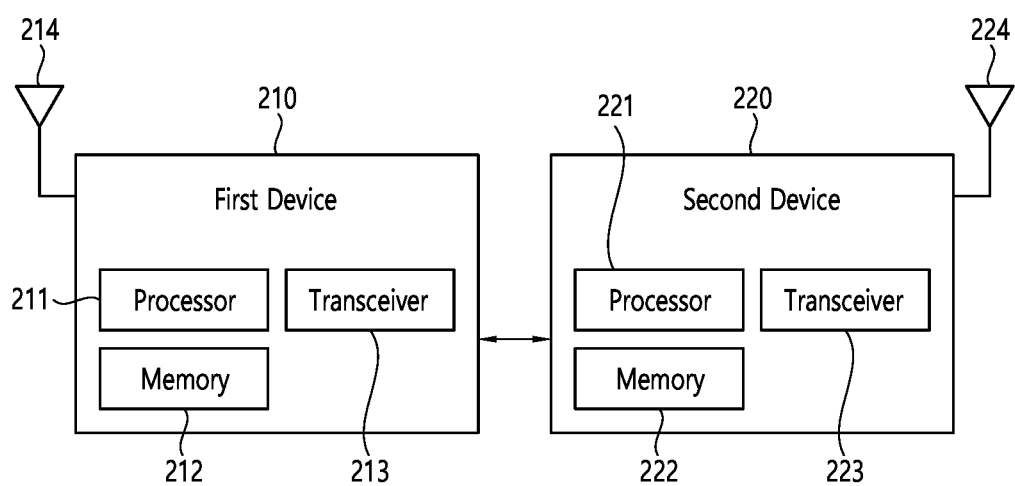
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g., a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
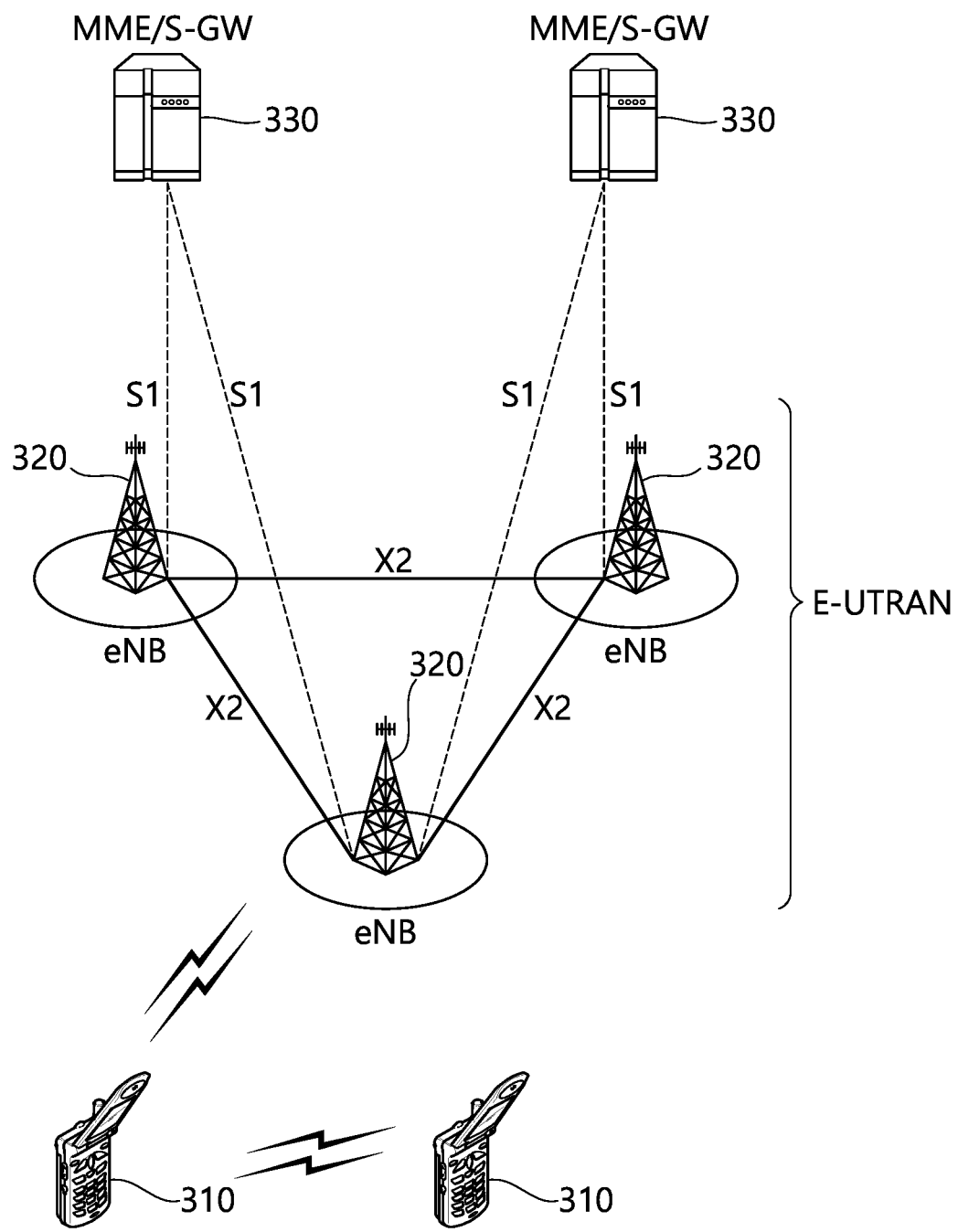
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
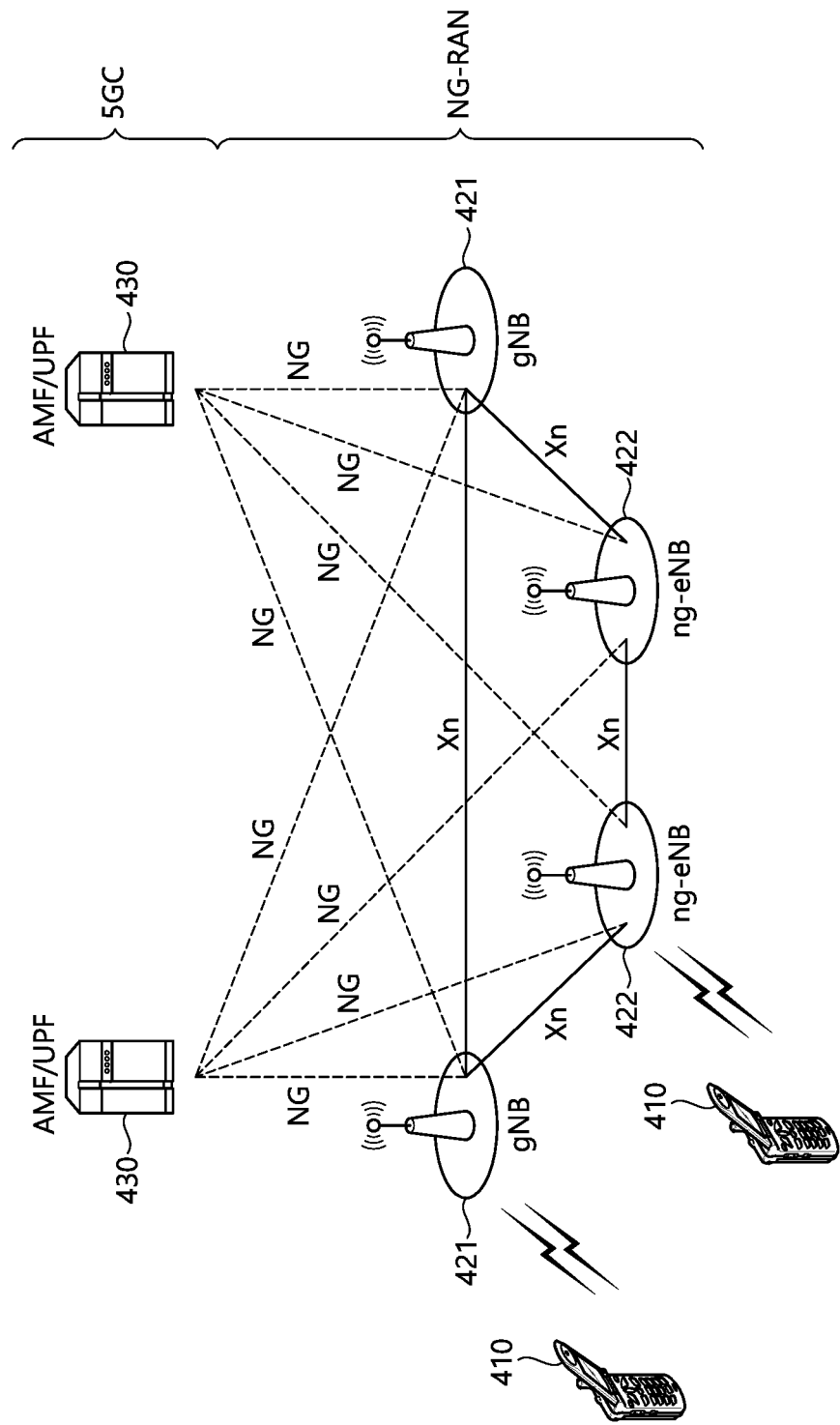
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g., eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g., NG-RAN and/or E-UTRAN) may be classified into a first layer (L1), a second layer (L2), and a third layer (L3) based on the lower three layers of the open system interconnection (OSI) model that is well-known in the communication system.

Figure 5:
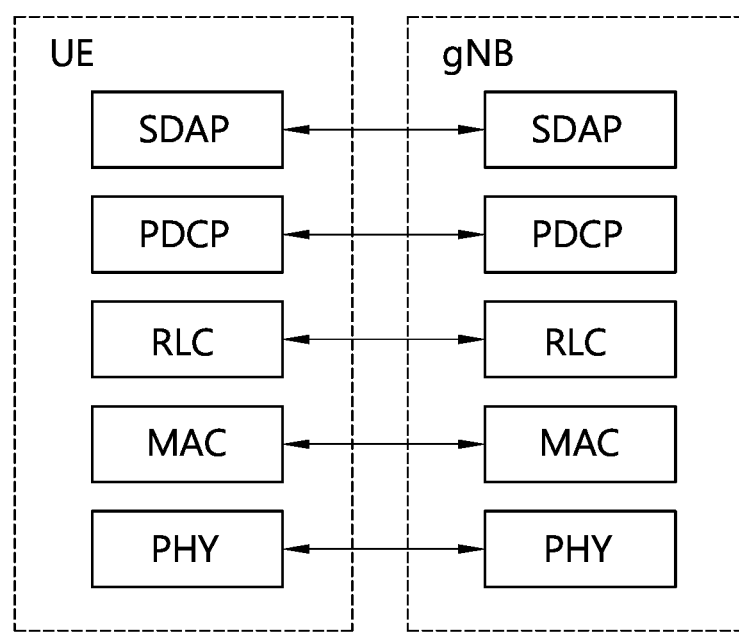
FIG. 5 shows a block diagram of a user plane protocol stack to which the technical features of the present disclosure can be applied.
Figure 6:
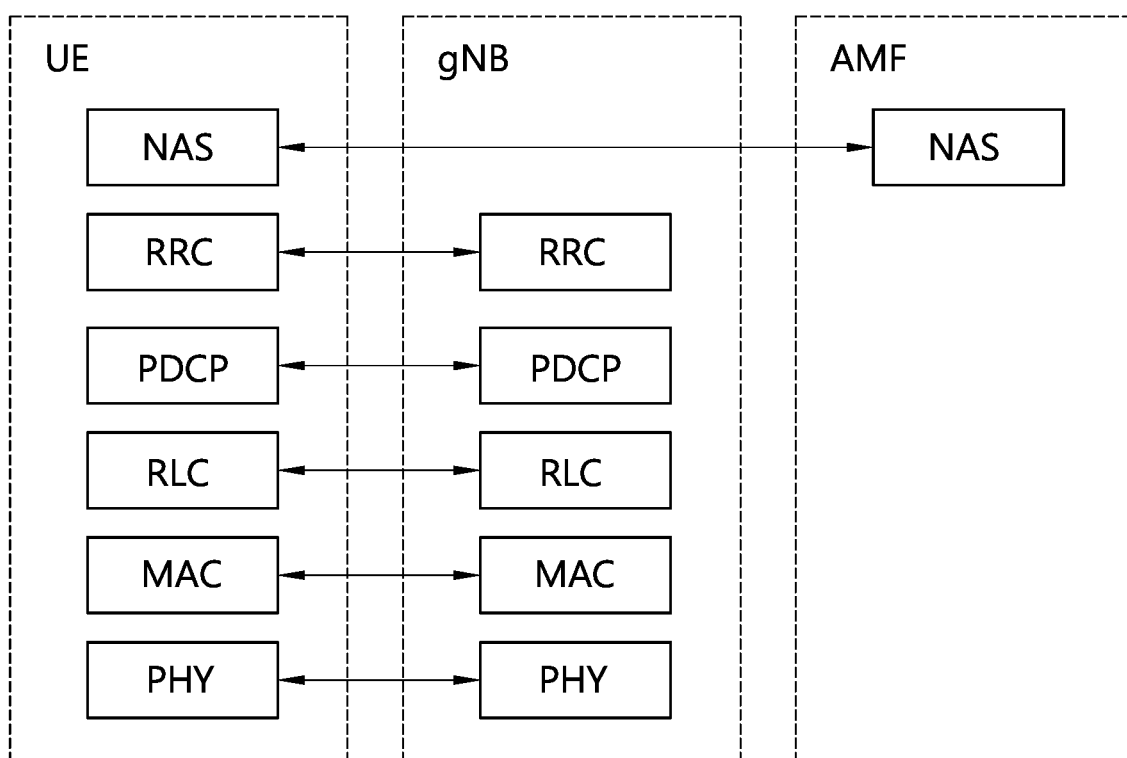
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

Figure 7:
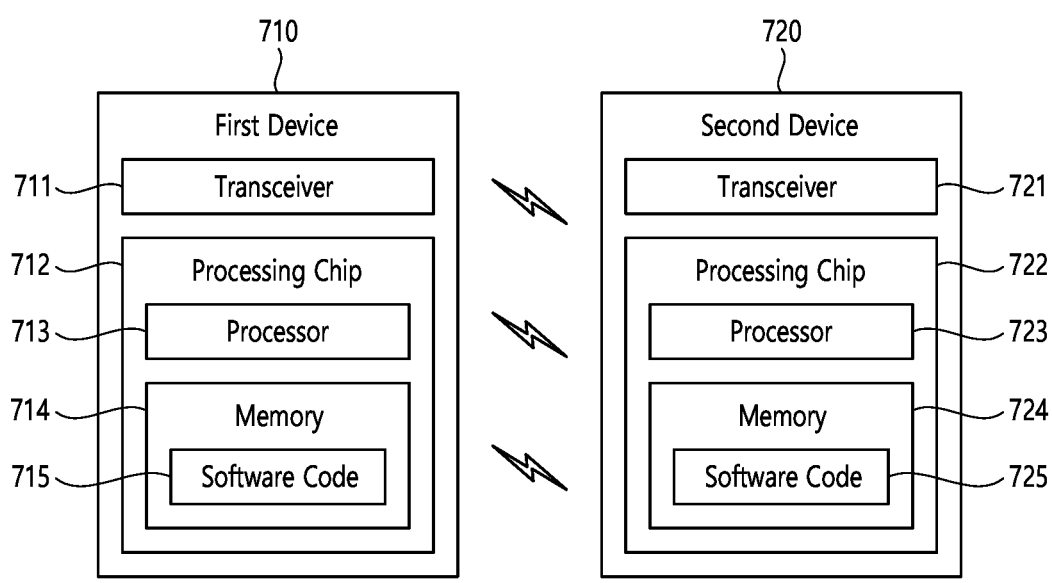
FIG. 7 shows another example of a wireless communication system to which the technical features of the present disclosure can be applied.

FIG. 7 shows another example of a wireless communication system to which the technical features of the present disclosure can be applied.

Referring to FIG. 7, wireless devices 710 and 720 may correspond to the wireless devices 210 and 220 of FIG. 2 and may be configured by various elements, components, units/portions, and/or modules.

The first wireless device 710 may include at least one transceiver, such as a transceiver 711, and at least one processing chip, such as a processing chip 712. The processing chip 712 may include at least one processor, such a processor 713, and at least one memory, such as a memory 714. The memory 714 may be operably connectable to the processor 713. The memory 714 may store various types of information and/or instructions. The memory 714 may store a software code 715 which implements instructions that, when executed by the processor 713, perform the descriptions, functions, procedures, suggestions, methods and/or operational flowcharts disclosed in the present disclosure. For example, the software code 715 may implement instructions that, when executed by the processor 713, perform the descriptions, functions, procedures, suggestions, methods and/or operational flowcharts disclosed in the present disclosure. For example, the software code 715 may control the processor 713 to perform one or more protocols. For example, the software code 715 may control the processor 713 may perform one or more layers of the radio interface protocol.

The second wireless device 720 may include at least one transceiver, such as a transceiver 721, and at least one processing chip, such as a processing chip 722. The processing chip 722 may include at least one processor, such a processor 723, and at least one memory, such as a memory 724. The memory 724 may be operably connectable to the processor 723. The memory 724 may store various types of information and/or instructions. The memory 724 may store a software code 725 which implements instructions that, when executed by the processor 723, perform the descriptions, functions, procedures, suggestions, methods and/or operational flowcharts disclosed in the present disclosure. For example, the software code 725 may implement instructions that, when executed by the processor 723, perform the descriptions, functions, procedures, suggestions, methods and/or operational flowcharts disclosed in the present disclosure. For example, the software code 725 may control the processor 723 to perform one or more protocols. For example, the software code 725 may control the processor 723 may perform one or more layers of the radio interface protocol.

Figure 8:
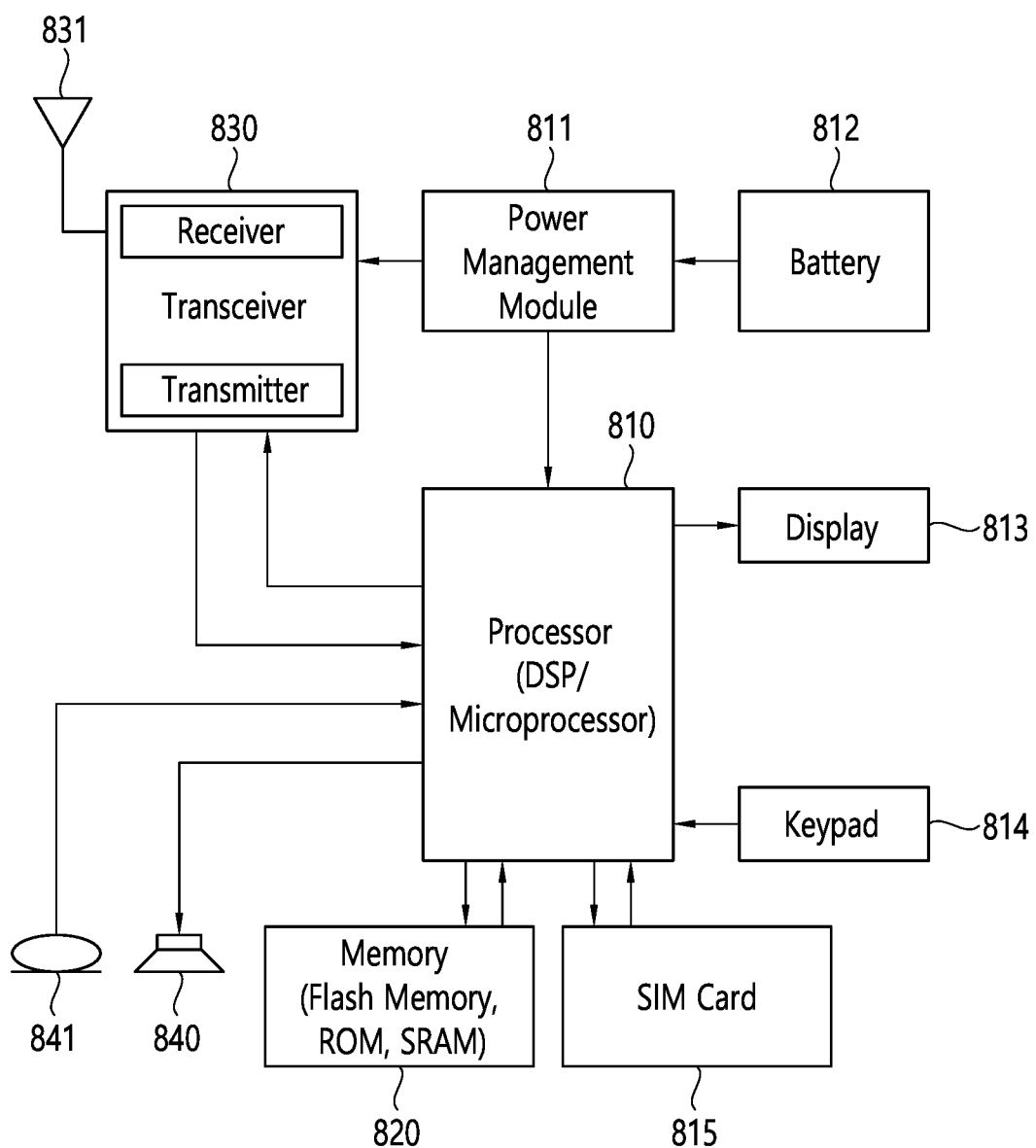
FIG. 8 shows a UE to which the technical features of the present disclosure can be applied.

FIG. 8 shows a UE to which the technical features of the present disclosure can be applied.

A UE includes a processor 810, a power management module 811, a battery 812, a display 813, a keypad 814, a subscriber identification module (SIM) card 815, a memory 820, a transceiver 830, one or more antennas 831, a speaker 840, and a microphone 841.

The processor 810 may be configured to implement the descriptions, functions, procedures, suggestions, methods and/or operational flowcharts disclosed in the present disclosure. The processor 810 may be configured to control one or more other components of the UE to implement the descriptions, functions, procedures, suggestions, methods and/or operational flowcharts disclosed in the present disclosure. Layers of the radio interface protocol may be implemented in the processor 810. The processor 810 may include ASIC, other chipset, logic circuit and/or data processing device. The processor 810 may be an application processor. The processor 810 may include at least one of a digital signal processor (DSP), a central processing unit (CPU), a graphics processing unit (GPU), a modem (modulator and demodulator). An example of the processor 810 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 811 manages power for the processor 810 and/or the transceiver 830. The battery 812 supplies power to the power management module 811. The display 813 outputs results processed by the processor 810. The keypad 814 receives inputs to be used by the processor 810. The keypad 814 may be shown on the display 813. The SIM card 815 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 820 is operatively coupled with the processor 810 and stores a variety of information to operate the processor 810. The memory 820 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 820 and executed by the processor 810. The memory 820 can be implemented within the processor 810 or external to the processor 810 in which case those can be communicatively coupled to the processor 810 via various means as is known in the art.

The transceiver 830 is operatively coupled with the processor 810, and transmits and/or receives a radio signal. The transceiver 830 includes a transmitter and a receiver. The transceiver 830 may include baseband circuitry to process radio frequency signals. The transceiver 830 controls the one or more antennas 831 to transmit and/or receive a radio signal.

The speaker 840 outputs sound-related results processed by the processor 810. The microphone 841 receives sound-related inputs to be used by the processor 810.

Figure 9:
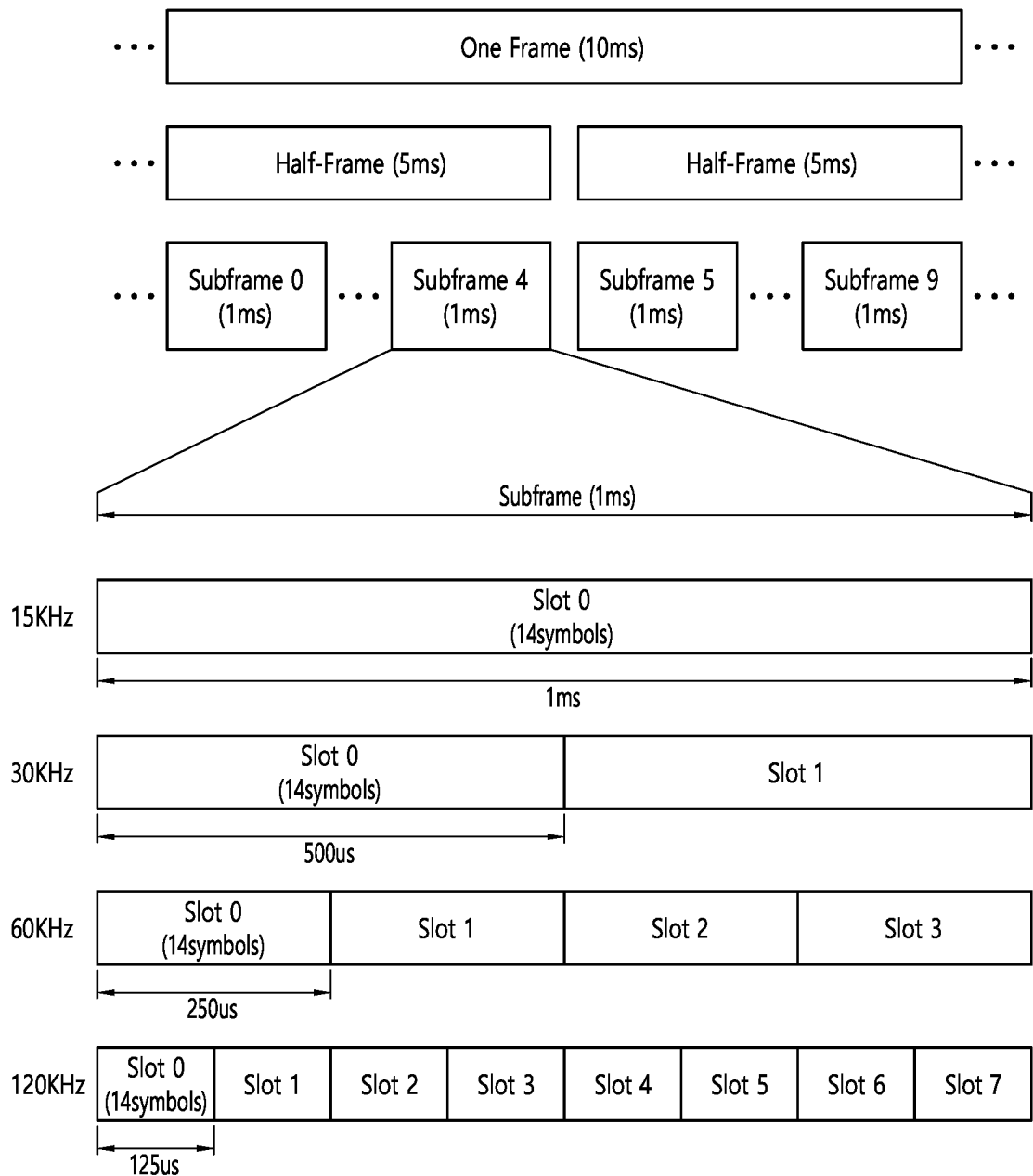
FIG. 9 shows a frame structure in a 3GPP based wireless communication system to which implementations of the present disclosure is applied.

FIG. 9 shows a frame structure in a 3GPP based wireless communication system to which implementations of the present disclosure is applied.

The frame structure shown in FIG. 9 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 9, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times. In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 10:
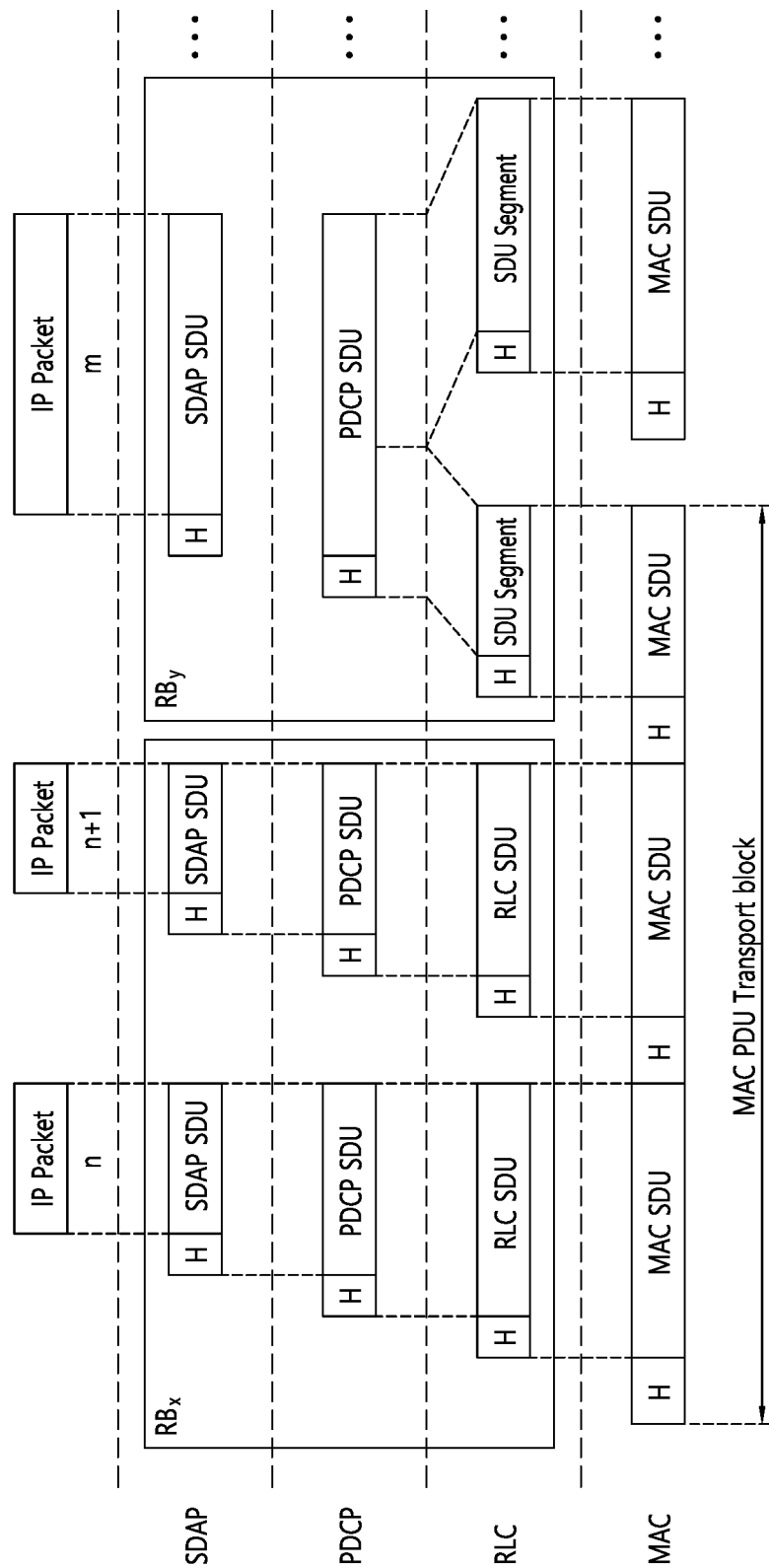
FIG. 10 shows a data flow example in the 3GPP NR system to which implementations of the present disclosure is applied.

FIG. 10 shows a data flow example in the 3GPP NR system to which implementations of the present disclosure is applied.

Referring to FIG. 10, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Support for vehicle-to-vehicle (V2V) and vehicle-to-everything (V2X) services has been introduced in LTE during Releases 14 and 15, in order to expand the 3GPP platform to the automotive industry. These work items defined an LTE sidelink suitable for vehicular applications, and complementary enhancements to the cellular infrastructure.

Further to this work, requirements for support of enhanced V2X use cases have been defined in 5G LTE/NR, which are broadly arranged into four use case groups:

1) Vehicles platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.

2) Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

3) Advanced driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.

4) Remote driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

NR sidelink (SL) unicast, groupcast, and broadcast design is described. SL broadcast, groupcast, and unicast transmissions are supported for the in-coverage, out-of-coverage and partial-coverage scenarios.

Figure 11:
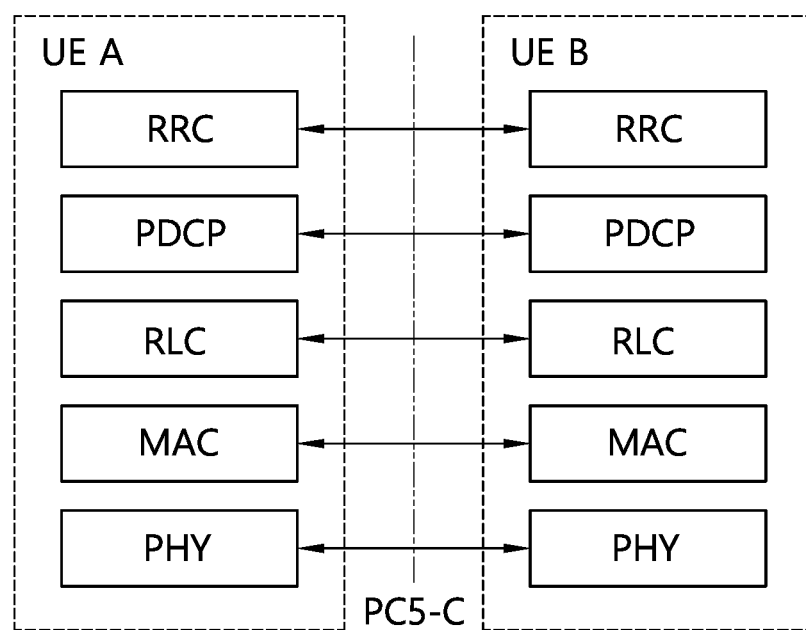
FIGS. 11 and 12 show an example of PC5 protocol stacks to which implementations of the present disclosure is applied.
Figure 12:
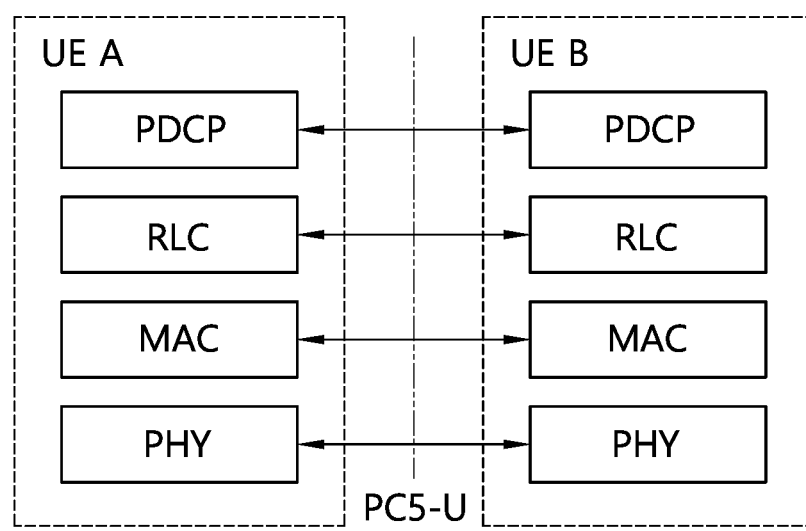

FIGS. 11 and 12 show an example of PC5 protocol stacks to which implementations of the present disclosure is applied.

FIG. 11 illustrates an example of a PC5 control plane (PC5-C) protocol stack between UEs. The AS protocol stack for the control plane in the PC5 interface consists of at least RRC, PDCP, RLC and MAC sublayers, and the physical layer.

FIG. 12 illustrates an example of a PC5 user plane (PC5-U) protocol stack between UEs. The AS protocol stack for user plane in the PC5 interface consists of at least PDCP, RLC and MAC sublayers, and the physical layer.

For the purposes of physical layer analysis, it is assumed that higher layers decide if unicast, groupcast, or broadcast transmission is to be used for a particular data transfer, and they correspondingly inform the physical layer. When considering a unicast or groupcast transmission, it is assumed that the UE is able to establish which unicast or groupcast session a transmission belongs to, and that the following identities is known to the physical layer:
    The layer-1 destination ID, conveyed via physical sidelink control channel (PSCCH)
    Additional layer-1 ID(s), conveyed via PSCCH, at least for the purpose of identifying which transmissions can be combined in reception when HARQ feedback is in use
    HARQ process ID For the purpose of Layer 2 analysis, it is assumed that upper layers (i.e., above AS) provide the information on whether it is a unicast, groupcast or broadcast transmission for a particular data transfer. For the unicast and groupcast transmission in SL, the following identities is known to Layer 2:
    Unicast: destination ID, source ID
    Groupcast: destination group ID, source ID
    Discovery procedure and related messages for the unicast and groupcast transmission are up to upper layers.

At least the following two SL resource allocation modes are defined as follows.

(1) Mode 1: BS schedules SL resource(s) to be used by UE for SL transmission(s).

(2) Mode 2: UE determines, i.e., BS does not schedule, SL transmission resource(s) within SL resources configured by BS/network or pre-configured SL resources.

The definition of SL resource allocation Mode 2 covers:
    a) UE autonomously selects SL resource for transmission
    b) UE assists SL resource selection for other UE(s)
    c) UE is configured with NR configured grant (Type-1 like) for SL transmission
    d) UE schedules SL transmissions of other UEs For SL resource allocation Mode 2, sensing and resource (re-)selection-related procedures may be considered. The sensing procedure considered is defined as decoding sidelink control information (SCI) from other UEs and/or SL measurements. The resource (re-)selection procedure considered uses the results of the sensing procedure to determine resource(s) for SL transmission.

For Mode 2(a), SL sensing and resource selection procedures may be considered in the context of a semi-persistent scheme where resource(s) are selected for multiple transmissions of different TBs and a dynamic scheme where resource(s) are selected for each TB transmission.

The following techniques may be considered to identify occupied SL resources:

Decoding of SL control channel transmissions
SL measurements
Detection of SL transmissions The following aspects may be considered for SL resource selection:

How a UE selects resource for PSCCH and physical sidelink shared channel (PSSCH) transmission (and other SL physical channel/signals that are defined)
Which information is used by UE for resource selection procedure Mode 2(b) is a functionality that can be part of Mode 2(a), (c), (d) operation.

For out-of-coverage operation, Mode 2(c) assumes a (pre-)configuration of single or multiple SL transmission patterns, defined on each SL resource pool. For in-coverage operation, Mode 2(c) assumes that gNB configuration indicates single or multiple SL transmission patterns, defined on each SL resource pool. If there is a single pattern configured to a transmitting UE, there is no sensing procedure executed by UE, while if multiple patterns are configured, there is a possibility of a sensing procedure.

A pattern is defined by the size and position(s) of the resource in time and frequency, and the number of resources.

For Mode 2(d), the procedures to become or serve as a scheduling UE for in-coverage and out-of-coverage scenarios may be considered as follows:

Scheduling UE is configured by gNB
Application layer or pre-configuration selects scheduling UE
Receiver UE schedules transmissions of the transmitter UE during the session
Scheduling UE is decided by multiple UEs including the one that is finally selected. The UE may autonomously decide to serve as a scheduling UE/offer scheduling UE functions (i.e., by self-nomination).

Until Rel-15, broadcast transmission is supported only for V2X communication. Broadcast transmission means that V2X transmission by one wireless device is broadcast to several unspecified wireless devices. In case of NR V2X, unicast and groupcast transmission may also be supported for V2X communication as well as broadcast transmission. Unicast transmission means that V2X transmission by one wireless device is transmitted to one specified other wireless device. Groupcast transmission means that V2X transmission by one wireless device is transmitted to several specified other wireless devices which belongs to a group. Unicast transmission is expected to be used for high reliability and low latency cases, e.g., extended sensor sharing and remote driving, emergency, etc.

In NR V2X, one wireless device may establish a PC5 link (e.g., one-to-one connection and/or session between wireless devices) for unicast service with another wireless device. PC5 Signaling protocol above RRC layer in the wireless devices may be used for unicast link establishment and management. Based on the unicast link establishment and management, the wireless devices may exchange PC5 signaling (i.e., upper layer signaling than RRC signaling) to successfully or unsuccessfully establish a unicast link with security activation or release the established unicast link.

Hereinafter, Physical uplink control channel is described. Section 5.2.3 of 3GPP TS 36.300 V15.6.0 can be referred.

The PUCCH/SPUCCH shall be mapped to a control channel resource in the uplink.

Depending on presence or absence of uplink timing synchronization, the uplink physical control signalling for scheduling request can differ.

In the case of time synchronization being present for the pTAG, the outband control signalling consists of:

CSI;
ACK/NAK;
Scheduling Request (SR).

The CSI informs the scheduler about the current channel conditions as seen by the UE. If MIMO transmission is used, the CSI includes necessary MIMO-related feedback.

The HARQ feedback in response to downlink data transmission consists of a single ACK/NAK bit per transport block in case of non-bundling configuration.

PUCCH/SPUCCH resources for SR, CSI reporting and possibly HARQ feedback are assigned and can be revoked through RRC signalling. An SR is not necessarily assigned to UEs acquiring synchronization through the RACH (i.e. synchronised UEs may or may not have a dedicated SR channel). PUCCH/SPUCCH resources for SR, CSI and HARQ feedback are lost when the UE is no longer synchronized.

PUCCH/SPUCCH is transmitted on PCell, PUCCH SCell (if such is configured in CA) and on PSCell (in DC).

The physical layer supports simultaneous transmission of PUCCH and subframe PUSCH, or of SPUCCH and (sub)slot-PUSCH. In case of SPUCCH and (sub)slot-PUSCH transmission, both the shared channel and the associated control channel shall be of the same transmission duration (slot or subslot).

Sidelink (SL) grant reception and sidelink control information (SCI) transmission is described. Section 5.14.1.1 of 3GPP TS 36.321 V15.7.0 can be referred.

In order to transmit on the sidelink shared channel (SL-SCH), the MAC entity must have at least one sidelink grant.

Sidelink grants are selected as follows for sidelink communication:

1> if the MAC entity is configured to receive a single sidelink grant dynamically on the PDCCH and more data is available in sidelink traffic channel (STCH) than can be transmitted in the current sidelink control (SC) period, the MAC entity shall:

2> using the received sidelink grant determine the set of subframes in which transmission of SCI and transmission of first transport block occur;

2> consider the received sidelink grant to be a configured sidelink grant occurring in those subframes starting at the beginning of the first available SC period which starts at least 4 subframes after the subframe in which the sidelink grant was received, overwriting a previously configured sidelink grant occurring in the same SC period, if available;

2> clear the configured sidelink grant at the end of the corresponding SC period;

1> else, if the MAC entity is configured by upper layers to receive multiple sidelink grants dynamically on the PDCCH and more data is available in STCH than can be transmitted in the current SC period, the MAC entity shall for each received sidelink grant:

2> using the received sidelink grant determine the set of subframes in which transmission of SCI and transmission of first transport block occur;

2> consider the received sidelink grant to be a configured sidelink grant occurring in those subframes starting at the beginning of the first available SC period which starts at least 4 subframes after the subframe in which the sidelink grant was received, overwriting a previously configured sidelink grant received in the same subframe number but in a different radio frame as this configured sidelink grant occurring in the same SC period, if available;

2> clear the configured sidelink grant at the end of the corresponding SC period;

1> else, if the MAC entity is configured by upper layers to transmit using one or multiple pool(s) of resources and more data is available in STCH than can be transmitted in the current SC period, the MAC entity shall for each sidelink grant to be selected:

2> if configured by upper layers to use a single pool of resources:

3> select that pool of resources for use;

2> else, if configured by upper layers to use multiple pools of resources:

3> select a pool of resources for use from the pools of resources configured by upper layers whose associated priority list includes the priority of the highest priority of the sidelink logical channel in the MAC PDU to be transmitted;

2> randomly select the time and frequency resources for SL-SCH and SCI of a sidelink grant from the selected resource pool. The random function shall be such that each of the allowed selections can be chosen with equal probability;

2> use the selected sidelink grant to determine the set of subframes in which transmission of SCI and transmission of first transport block occur;

2> consider the selected sidelink grant to be a configured sidelink grant occurring in those subframes starting at the beginning of the first available SC period which starts at least 4 subframes after the subframe in which the sidelink grant was selected;

2> clear the configured sidelink grant at the end of the corresponding SC period;

Retransmissions on SL-SCH cannot occur after the configured sidelink grant has been cleared.

Sidelink grants are selected as follows for vehicle-to-everything (V2X) sidelink communication:

1> if the MAC entity is configured to receive a sidelink grant dynamically on the PDCCH and data is available in STCH, the MAC entity shall for each carrier configured in sl-V2X-ConfigDedicated for which a sidelink grant has been dynamically received on the PDCCH for this TTI:

2> use the received sidelink grant to determine the number of HARQ retransmissions and the set of subframes in which transmission of SCI and SL-SCH occur;

2> consider the received sidelink grant to be a configured sidelink grant for the carrier;

1> if the MAC entity is configured by upper layers to receive a sidelink grant on the PDCCH addressed to SL semi-persistent scheduling (SPS) V2X radio network temporary identity (V-RNTI), the MAC entity shall for each SL SPS configuration and for each carrier configured in sl-V2X-ConfigDedicated for which a sidelink grant has been received on the PDCCH addressed to SL semi-persistent scheduling V-RNTI for this TTI:

2> if PDCCH contents indicate SPS activation:

3> use the received sidelink grant to determine the number of HARQ retransmissions and the set of subframes in which transmission of SCI and SL-SCH occur;

3> consider the received sidelink grant to be a configured sidelink grant for the carrier.

2> if PDCCH contents indicate SPS release:

3> lear the corresponding configured sidelink grant for the carrier.

1> if the MAC entity is configured by upper layers to transmit using pool(s) of resources in one or multiple carriers based on sensing, or partial sensing, or random selection only if upper layers indicates that transmissions of multiple MAC PDUs are allowed, and the MAC entity selects to create a configured sidelink grant corresponding to transmissions of multiple MAC PDUs, and data is available in STCH associated with one or multiple carriers, the MAC entity shall for each sidelink process configured for multiple transmissions:

2> if there is no configured sidelink grant associated with the sidelink process on any carrier allowed for the STCH as indicated by upper layers:

3> trigger the TX carrier (re-)selection procedure as specified below;

2> else if there is a configured sidelink grant associated with the sidelink process:

3> if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or 3> if neither transmission nor retransmission has been performed by the MAC entity on any resource indicated in the configured sidelink grant during the last second; or 3> if sl-ReselectAfter is configured and the number of consecutive unused transmission opportunities on resources indicated in the configured sidelink grant is equal to sl-ReselectAfter; or 3> if none of the configured sidelink grant(s) on the carrier(s) allowed for the STCH have radio resources available in this TTI to accommodate a RLC SDU by using the maximum allowed modulation and coding scheme (MCS) configured by upper layers in maxMCS-PSSCH and the MAC entity selects not to segment the RLC SDU; or 3> if none of the configured sidelink grant(s) on the carrier(s) allowed for the STCH have radio resources available in this TTI, to fulfil the latency requirement of the data in a sidelink logical channel according to the associated ProSe-per-packet priority (PPPP), and the MAC entity selects not to perform transmission(s) corresponding to a single MAC PDU; or 3> if the pool of resources where the sidelink grant is configured for the sidelink process, is reconfigured by upper layers:

4> trigger the TX carrier (re-)selection procedure as specified below;

4> clear the configured sidelink grant associated to the sidelink process;

4> flush the HARQ buffer associated to the sidelink process;

3> else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by upper layers in probResourceKeep:

4> clear the configured sidelink grant, if available;

4> randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

4> use the previously selected sidelink grant for the number of transmissions of the MAC PDUs with the resource reservation interval to determine the set of subframes in which transmissions of SCI and SL-SCH occur;

4> consider the selected sidelink grant to be a configured sidelink grant;

2> if the TX carrier (re-)selection procedure was triggered in above and one or more carriers have been (re-)selected in the Tx carrier (re-)selection:

3> determine the order of the (re-)selected carriers, according to the decreasing order based on the highest priority of logical channels which are allowed on each (re-)selected carrier, and perform the following for each Sidelink process on each (re-)selected carrier according to the order:

4> select one of the allowed values configured by upper layers in restrictResourceReservationPeriod and set the resource reservation interval by multiplying 100 with the selected value;

4> randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

4> select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the channel busy ratio (CBR) measured by lower layers if CBR measurement results are available or the corresponding defaultTxConfigIndex configured by upper layers if CBR measurement results are not available;

4> select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

4> randomly select the time and frequency resources for one transmission opportunity from the resources indicated by the physical layer, according to the amount of selected frequency resources. The selected time and frequency resources shall fulfil the physical layer requirements, and the random function shall be such that each of the allowed selections can be chosen with equal probability;

4> use the randomly selected resource to select a set of periodic resources spaced by the resource reservation interval for transmission opportunities of SCI and SL-SCH corresponding to the number of transmission opportunities of MAC PDUs;

4> if the number of HARQ retransmissions is equal to 1:

5> if there are available resources left in the resources indicated by the physical layer that meet the conditions for more transmission opportunities:

6> randomly select the time and frequency resources for one transmission opportunity from the available resources, according to the amount of selected frequency resources. The selected time and frequency resources shall fulfil the physical layer requirements, and the random function shall be such that each of the allowed selections can be chosen with equal probability;

6> use the randomly selected resource to select a set of periodic resources spaced by the resource reservation interval for the other transmission opportunities of SCI and SL-SCH corresponding to the number of retransmission opportunities of the MAC PDUs;

6> consider the first set of transmission opportunities as the new transmission opportunities and the other set of transmission opportunities as the retransmission opportunities;

6> consider the set of new transmission opportunities and retransmission opportunities as the selected sidelink grant.

4> else:

5> consider the set as the selected sidelink grant;

4> use the selected sidelink grant to determine the set of subframes in which transmissions of SCI and SL-SCH occur;

4> consider the selected sidelink grant to be a configured sidelink grant;

1> else, if the MAC entity is configured by upper layers to transmit using pool(s) of resources in one or multiple carriers, the MAC entity selects to create a configured sidelink grant corresponding to transmission(s) of a single MAC PDU, and data is available in STCH associated with one or multiple carriers, the MAC entity shall for a sidelink process:

2> trigger the TX carrier (re-)selection procedure as specified below;

2> if one or more carriers have been (re-)selected in the Tx carrier (re-)selection:

3> determine the order of the (re-)selected carriers, according to the decreasing order based on the highest priority of logical channels which are allowed on each (re-)selected carrier, and perform the following for each Sidelink process on each (re-)selected carrier according to the order:

4> select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

4> select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

4> randomly select the time and frequency resources for one transmission opportunity of SCI and SL-SCH from the resources indicated by the physical layer, according to the amount of selected frequency resources. The selected time and frequency resources shall fulfil the physical layer requirement, and the random function shall be such that each of the allowed selections can be chosen with equal probability;

4> if the number of HARQ retransmissions is equal to 1:

5> if there are available resources left in the resources indicated by the physical layer that meet the conditions for one more transmission opportunity:

6> randomly select the time and frequency resources for the other transmission opportunity of SCI and SL-SCH corresponding to additional transmission of the MAC PDU from the available resources, according to the amount of selected frequency resources. The selected time and frequency resources shall fulfil the physical layer requirements, and the random function shall be such that each of the allowed selections can be chosen with equal probability;

6> consider a transmission opportunity which comes first in time as the new transmission opportunity and a transmission opportunity which comes later in time as the retransmission opportunity;

6> consider both of the transmission opportunities as the selected sidelink grant;

4> else:

5> consider the transmission opportunity as the selected sidelink grant;

4> use the selected sidelink grant to determine the subframes in which transmission(s) of SCI and SL-SCH occur];

4> consider the selected sidelink grant to be a configured sidelink grant.

For V2X sidelink communication, the UE should ensure the randomly selected time and frequency resources fulfill the latency requirement.

The MAC entity shall for each subframe:

1> for each configured sidelink grant occurring in this subframe:

2> if SL_RESOURCE_RESELECTION_COUNTER=1 for the sidelink process associated with the configured sidelink grant and the MAC entity randomly selected, with equal probability, a value in the interval [0, 1] which is above the probability configured by upper layers in probResourceKeep:

3> set the resource reservation interval for the configured sidelink grant equal to 0;

2> if the configured sidelink grant corresponds to transmission of SCI:

3> for V2X sidelink communication in UE autonomous resource selection:

4> consider the selected transmission format to be SL-V2X-TxProfile for the highest priority of the sidelink logical channel(s) in the MAC PDU;

4> select a MCS which is, if configured, within the range that is configured by upper layers between minMCS-PSSCH and maxMCS-PSSCH included in pssch-TxConfigList associated with the selected transmission format and, if configured by upper layers, overlapped between minMCS-PSSCH and maxMCS-PSSCH indicated in cbr-pssch-TxConfigList associated with the selected transmission format for the highest priority of the sidelink logical channel(s) in the MAC PDU and the CBR measured by lower layers if CBR measurement results are available or the corresponding defaultTxConfigIndex configured by upper layers if CBR measurement results are not available;

3> for V2X sidelink communication in scheduled resource allocation:

4> consider the selected transmission format to be SL-V2X-TxProfile for the highest priority of the sidelink logical channel(s) in the MAC PDU;

4> select a MCS which is associated with the selected transmission format unless it is configured by upper layer;

3> instruct the physical layer to transmit SCI corresponding to the configured sidelink grant;

3> for V2X sidelink communication, deliver the configured sidelink grant, the associated HARQ information and the value of the highest priority of the sidelink logical channel(s) in the MAC PDU to the sidelink HARQ entity for this subframe;

2> else if the configured sidelink grant corresponds to transmission of first transport block for sidelink communication:

3> deliver the configured sidelink grant and the associated HARQ information to the sidelink HARQ entity for this subframe.

Hereinafter, Random Access Channel (RACH) procedure in NR is described.

For NR, RACH can be configured either 2-step RACH or 4-step RACH.

For 4-step RACH, UE transmits a RACH preamble, receives Random Access Response MAC CE, transmits a message 3 on PUSCH, and receive Contention Resolution MAC CE.

For 2-step RACH, UE transmits a message A consisting of a RACH preamble and PUSCH resource, and receives a message B consisting of Random Access Response and Contention Resolution.

The Sidelink Channel Status Information (SL CSI) reporting procedure is used to provide a peer UE with sidelink channel status such as CQI and RI.

However, some of the triggered SL CSI reporting procedure are need to be cancelled for saving resources.

Therefore, studies for cancelling SL CSI reporting in a wireless communication system are required.

Hereinafter, a method and apparatus for cancelling sidelink (SL) channel state information (CSI) reporting in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 13:
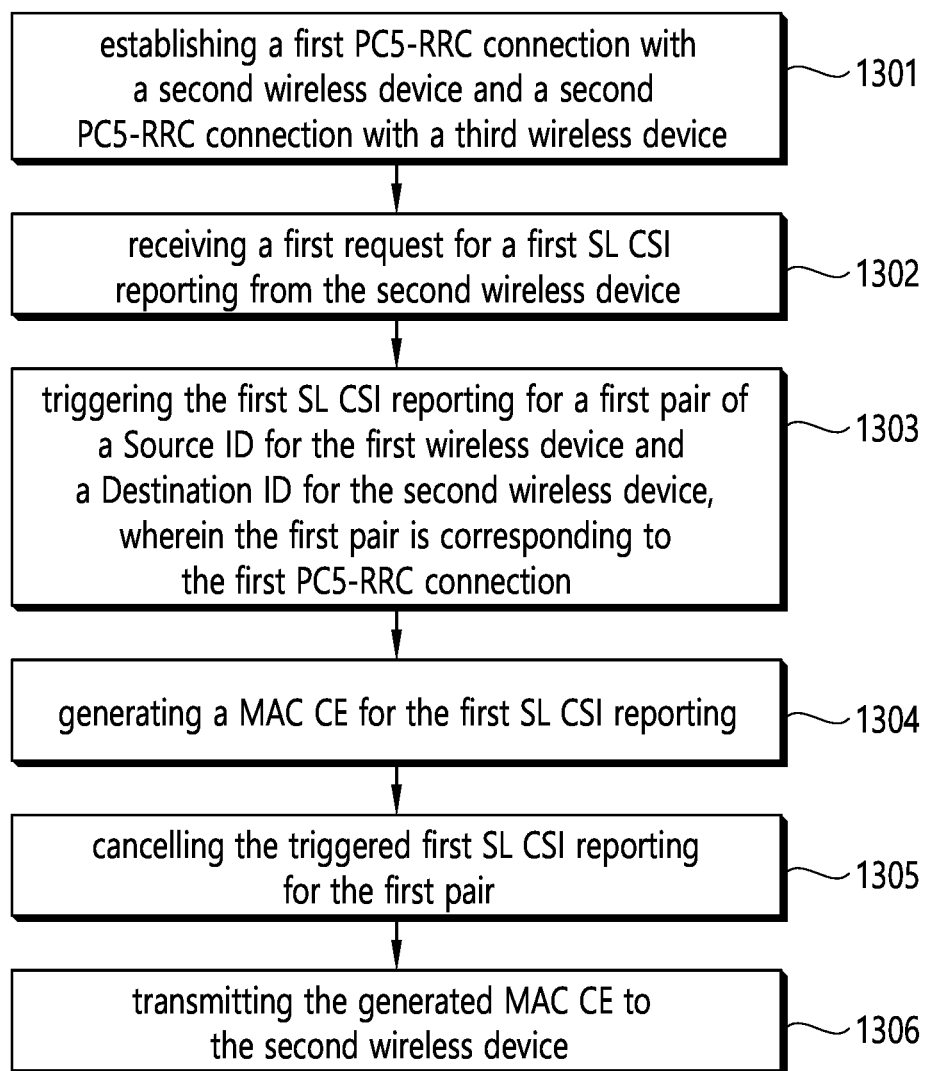
FIG. 13 shows an example of a method for cancelling sidelink (SL) channel state information (CSI) reporting in a wireless communication system, according to some embodiments of the present disclosure.

FIG. 13 shows an example of a method for cancelling sidelink (SL) channel state information (CSI) reporting in a wireless communication system, according to some embodiments of the present disclosure.

In particular, FIG. 13 shows an example of a method performed by a wireless device.

In step 1301, a first wireless device may establish a first PC5-Radio Resource Control (RRC) connection with a second wireless device and a second PC5-RRC connection with a third wireless device.

The first wireless device may independently establish the first PC5-RRC connection and the second PC5-RRC connection. For example, the first wireless device may establish the first PC5-RRC connection before or after establishing the second PC5-RRC connection. For example, the first wireless device may establish the first PC5-RRC connection and the second PC5-RRC connection together.

In step 1302, a first wireless device may receive a first request for a first sidelink (SL) Channel State Information (CSI) reporting from the second wireless device.

For example, the first request for the first SL CSI reporting may include a Sidelink Control Information (SCI) transmitted via a Physical Sidelink Control Channel (PSCCH) and/or a Physical Sidelink Shared Channel (PSSCH).

For example, a MAC entity of the first wireless device may monitor a PSCCH for each PSCCH duration to receive a first stage SCI. If a first stage SCI has been received on the PSCCH, the MAC entity may determine the set of PSSCH duration to receive a second stage SCI. If the second stage SCI for this PSSCH has been received on the PSSCH, the MAC entity may store the SCI as a valid SCI.

In step 1303, a first wireless device may trigger the first SL CSI reporting for a first pair of a Source ID for the first wireless device and a Destination ID for the second wireless device. The first pair may be corresponding to the first PC5-RRC connection.

For example, the first wireless device may trigger the first SL CSI upon receiving the first request for the first SL CSI reporting from the second wireless device.

According to some embodiments of the present disclosure, a first wireless device may start a timer related to the first SL CSI reporting upon triggering the first SL CSI reporting.

For example, the first wireless device may cancel the triggered first SL CSI reporting upon expiry of the timer.

For example, the timer may be configured for each pair of a Source ID and a Destination ID corresponding to a PC5-RRC connection.

In step 1304, a first wireless device may generate a MAC CE for the first SL CSI reporting.

For example, a MAC entity of the first wireless device may instruct the Multiplexing and Assembly procedure to generate a Sidelink CSI Reporting MAC CE.

For example, the first wireless device may generate the SL CSI reporting MAC CE when a MAC entity of the first wireless device has SL resources allocated for new transmission.

For example, the generated MAC CE may include a Channel Quality Indicator (CQI) for the first PC5-RRC connection. For example, the generated MAC CE may include a Rank Indicator (RI) for sidelink CSI reporting and the CQI.

For example, a size of the generated MAC CE may be an Octet. For example, the generated MAC CE may include 1 bit of the RI and 4 bit of CQI.

In step 1305, a first wireless device may cancel the triggered first SL CSI reporting for the first pair.

For example, a first wireless device may cancel the triggered first SL CSI reporting for the first pair after generating a MAC CE for the first SL CSI reporting.

In step 1306, a first wireless device may transmit the generated MAC CE to the second wireless device.

For example, the first wireless device may transmit the generated MAC CE to the second wireless device after generating a MAC CE for the first SL CSI reporting.

For example, the first wireless device may transmit the generated MAC CE to the second wireless device before or after cancelling the triggered first SL CSI reporting for the first pair.

For example, the first wireless device may transmit the generated MAC CE to the second wireless device while cancelling the triggered first SL CSI reporting for the first pair.

According to some embodiments of the present disclosure, a first wireless device may receive a second request for a second SL CSI reporting from the third wireless device.

For example, a first wireless device may trigger the second SL CSI reporting for a second pair of a Source ID for the first wireless device and a Destination ID for the third wireless device. The second pair may be corresponding to the second PC5-RRC connection.

In this case, a first wireless device may maintain the triggered second SL CSI reporting for the second pair while cancelling the triggered first SL CSI reporting for the first pair.

For example, the cancelling the triggered first SL CSI reporting for the first pair may be independent from the triggered second SL CSI reporting for the second pair.

According to some embodiments of the present disclosure, a first wireless device may receive a third request for a third SL CSI reporting from the second wireless device.

For example, a first wireless device may trigger the third SL CSI reporting for a third pair of a Source ID for the first wireless device and a Destination ID for the second wireless device. The third pair may be corresponding to the first PC5-RRC connection.

For example, the Source ID for the first wireless device and/or the Destination ID for the second wireless device included in the first pair may be different from the Source ID for the first wireless device and/or the Destination ID for the second wireless device included in the third pair.

For other example, the Source ID for the first wireless device and/or the Destination ID for the second wireless device included in the first pair may be same as the Source ID for the first wireless device and/or the Destination ID for the second wireless device included in the third pair.

For example, a first wireless device may maintain the triggered third SL CSI reporting for the third pair while cancelling the triggered first SL CSI reporting for the first pair.

For example, the cancelling the triggered first SL CSI reporting for the first pair may be independent from the triggered second SL CSI reporting for the second pair.

According to some embodiments of the present disclosure, a first wireless device may be in communication with at least one of a user equipment, a network, or an autonomous vehicle other than the first wireless device.

Figure 14:
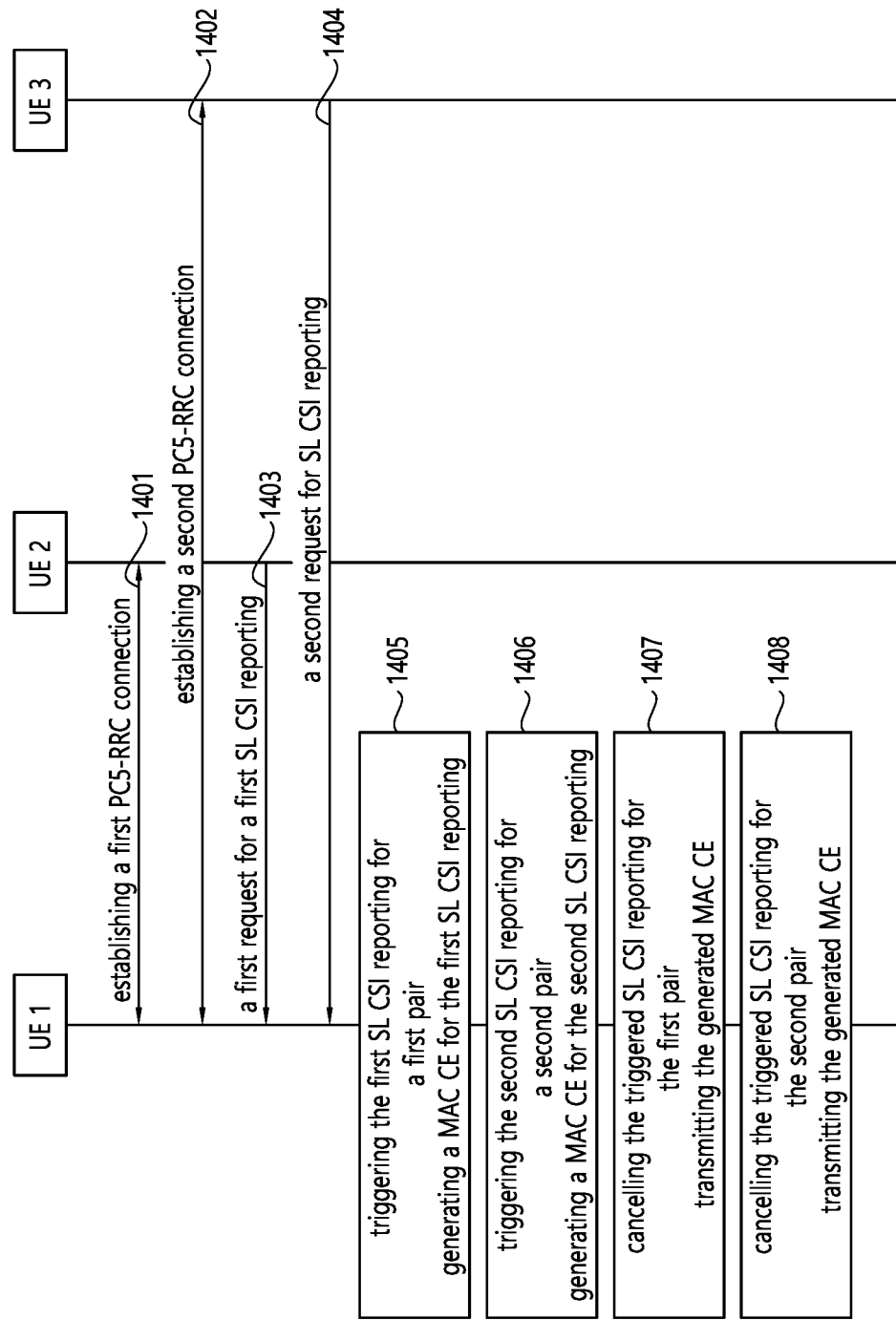
FIG. 14 shows an example of SL CSI reporting performed by a first UE in a wireless communication system, according to some embodiments of the present disclosure.

FIG. 14 shows an example of SL CSI reporting performed by a first UE in a wireless communication system, according to some embodiments of the present disclosure.

In step 1401, the first UE may establish a first PC5-RRC connection with a second UE.

In step 1402, the first UE may establish a second PC5-RRC connection with a third UE.

In step 1403, the first UE may receive a first request for a first SL CSI reporting from the second UE.

In step 1404, the first UE may receive a second request for a second SL CSI reporting from the third UE.

In step 1405, the first UE may trigger the first SL CSI reporting for a first pair of a Source ID for the first UE and a Destination ID for the second UE. The first pair may be corresponding to the first PC5-RRC connection.

The first UE may generate a MAC CE for the first SL CSI reporting after generating a MAC CE for the first SL CSI reporting.

In step 1406, the first UE may trigger the second SL CSI reporting for a second pair of a Source ID for the first UE and a Destination ID for the third UE. The second pair may be corresponding to the second PC5-RRC connection.

The first UE may generate a MAC CE for the second SL CSI reporting after generating a MAC CE for the second SL CSI reporting.

In step 1407, the first UE may cancel the triggered first SL CSI reporting for the first pair and transmit the generated MAC CE to the second UE.

For example, the first UE may cancel the triggered first SL CSI reporting for the first pair independent from the second SL CSI reporting for the second pair.

In other words, the first UE may only cancel the triggered SL CSI reporting by checking that the trigged SL CSI reporting is for the first pair or not.

In step 14078, the first UE may cancel the triggered second SL CSI reporting for the second pair and transmit the generated MAC CE to the third UE.

For example, the first UE may only cancel the triggered SL CSI reporting by checking that the trigged SL CSI reporting is for the second pair or not.

Hereinafter, a method for cancelling sidelink (SL) channel state information (CSI) reporting in a wireless communication system, according to some embodiments of the present disclosure will be described. The method may be performed by a wireless device, for example, a UE.

According to some embodiments of the present disclosure, a UE may perform SL CSI reporting procedure.

The Sidelink Channel Status Information (SL CSI) reporting procedure is used to provide a peer UE with sidelink channel status such as CQI and RI based on measurement on SL CSI-RS transmission(s) provided by the peer UE.

RRC configures the following parameters to control the SL CSI reporting for each pair of the Source Layer-2 ID and the Destination Layer-2 ID:
periodicCSI-TimerSL;
retxCSI-TimerSL;
CSIreporting-DelayTimerAppliedSL;
CSIreporting-DelayTimerSL;
CSIreporting-MaskSL.

The MAC entity shall for the pair of the Source Layer-2 ID and the Destination Layer-2 ID:
1> for each SCI in which the MAC entity is interested:
2> if the SCI indicates SL CSI reporting:
3> triggers SL CSI reporting for the pair;
3> consider the priority of the SL CSI Reporting MAC CE as either the highest priority of the logical channels belonging to the pair or the priority value indicated by this SCI or by the peer UE via a PC5-RRC signaling.

The priority of the SL CSI Reporting MAC CE is used for logical channel prioritization, transmission of SCI information indicating the presence and priority of the SL CSI Reporting MAC CE, and prioritization of SL transmission carrying the SL CSI Reporting MAC CE over any UL transmission in collision.
1> if UL resources are allocated and the number of padding bits remaining is equal to or larger than the size of the SL CSI Reporting MAC CE plus its subheader; or
1> if retxCSI-TimerSL expires for the pair; or
1> if periodicCSI-TimerSL expires for the pair:
2> triggers SL CSI reporting for the pair.

1> if the SL CSI reporting is triggered for the pair for which CSIreporting-DelayTimerAppliedSL with value true is configured by upper layers; or
2> start or restart the CSIreporting-DelayTimerSL.
1> else:
2> if running, stop the CSIreporting-DelayTimerSL.

For SL CSI reporting triggered by retxCSI-TimerSL expiry, the MAC entity considers the highest priority of the logical channels belonging to the pair as the priority of the SL CSI reporting.

The MAC entity shall for the pair of the Source Layer-2 ID and the Destination Layer-2 ID:
1> if the SL CSI reporting procedure determines that at least one SL CSI reporting has been triggered and not cancelled:
2> if SL-SCH resources are available for a new transmission and the SL-SCH resources can accommodate the SL CSI Reporting MAC CE plus its subheader as a result of logical channel prioritization; or
2> if UL resources are allocated and the number of padding bits remaining is equal to or larger than the size of the SL CSI Reporting MAC CE plus its subheader:
3> instruct the Multiplexing and Assembly procedure to generate the SL CSI Reporting MAC CE in which CSI information is included based on up to the latest measured result on SL CSI-RI transmission provided by the peer UE for the pair;
3> consider the priority of the SL CSI Reporting MAC CE as either the highest priority of the logical channels belonging to the Destination or the priority value indicated by this SCI or by the peer UE via a PC5-RRC signaling for logical channel prioritization, for transmission of SCI information indicating the presence and priority of the SL CSI Reporting MAC CE, and for prioritization of SL transmission carrying the SL CSI Reporting MAC CE over any UL transmission in collision.
3> start or restart periodicCSI-TimerSL;
3> start or restart retxCSI-TimerSL;
3> cancel all SL CSI reporting triggered for the pair.
2> if a SL CSI reporting has been triggered and CSIreporting-DelayTimerSL is not running:
3> if there is no SL-SCH resource available for a new transmission; or
3> if a configured sidelink grant is available for the SL CSI reporting and the SL CSI reporting was triggered for the pair for which CSIreporting-MaskSL is set to false:
4> trigger the TX resource (re-)selection According to some embodiments of the present disclosure, a UE may perform CSI reporting.

The Sidelink Channel State Information (SL-CSI) reporting procedure is used to provide a peer UE with sidelink channel state information.

RRC configures the following parameters to control the SL-CSI reporting procedure:
sl-LatencyBound-CSI-Report, which is maintained for each PC5-RRC connection.

The MAC entity maintains a sl-CSI-ReportTimer for each pair of the Source Layer-2 ID and the Destination Layer-2 ID corresponding to a PC5-RRC connection. sl-CSI-Report-Timer is used for a SL-CSI reporting UE to follow the latency requirement signalled from a CSI triggering UE. The value of sl-CSI-ReportTimer is the same as the latency requirement of the SL-CSI reporting in sl-LatencyBound-CSI-Report configured by RRC.

The MAC entity shall for each pair of the Source Layer-2 ID and the Destination Layer-2 ID corresponding to a PC5-RRC connection which has been established by upper layers:

1> if the SL-CSI reporting has been triggered by a SCI and not cancelled:
2> if the sl-CSI-ReportTimer for the triggered SL-CSI reporting is not running:
3> start the sl-CSI-ReportTimer.
2> if the sl-CSI-ReportTimer for the triggered SL-CSI reporting expires:
3> cancel the triggered SL-CSI reporting.
2> else if the MAC entity has SL resources allocated for new transmission and the SL-SCH resources can accommodate the SL CSI reporting MAC CE and its subheader as a result of logical channel prioritization:
3> instruct the Multiplexing and Assembly procedure to generate a Sidelink CSI Reporting MAC CE;
3> stop the sl-CSI-ReportTimer for the triggered SL-CSI reporting;
3> cancel the triggered SL-CSI reporting.
2> else if the MAC entity has been configured with Sidelink resource allocation mode 1:
3> trigger a Scheduling Request.

The MAC entity configured with Sidelink resource allocation mode 1 may trigger a Scheduling Request if transmission of a pending SL-CSI reporting with the sidelink grant(s) cannot fulfil the latency requirement associated to the SL-CSI reporting.

According to some embodiments of the present disclosure, a Sidelink CSI Reporting MAC CE generated by a wireless device may include 8 bits of 1 Octet.

The Sidelink CSI Reporting MAC CE is identified by a MAC subheader with LCID. The priority of the Sidelink CSI Reporting MAC CE is fixed to '1'. The Sidelink CSI Reporting MAC CE is defined as follows:

RI: This field indicates the derived value of the Rank Indicator for sidelink CSI reporting. The length of the field is 1 bit;
CQI: This field indicates the derived value of the Channel Quality Indicator for sidelink CSI reporting. The length of the field is 4 bit;
R: Reserved bit, set to 0.

For example, a Sidelink CSI Reporting MAC CE may include 1 bit of RI, 5 bit of COI, and 3 bit of R.

Hereinafter, an apparatus for cancelling sidelink (SL) channel state information (CSI) reporting in a wireless communication system, according to some embodiments of the present disclosure, will be described. Herein, the apparatus may be a wireless device (100 or 200) in FIG. 2 or a wireless device (710 or 720) in FIG. 3, or a wireless device in FIG. 8.

For example, a first wireless device may perform methods described above. The detailed description overlapping with the above-described contents could be simplified or omitted.

Referring to FIG. 2, a first wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to establish a first PC5-Radio Resource Control (RRC) connection with a second wireless device and a second PC5-RRC connection with a third wireless device. The processor 102 may be configured to control the transceiver (106) to receive a first request for a first sidelink (SL) Channel State Information (CSI) reporting from the second wireless device. The processor 102 may be configured to trigger the first SL CSI reporting for a first pair of a Source ID for the first wireless device and a Destination ID for the second wireless device. The first pair may be corresponding to the first PC5-RRC connection. The processor 102 may be configured to generate a MAC CE for the first SL CSI reporting. The processor 102 may be configured to cancel the triggered first SL CSI reporting for the first pair. The processor 102 may be configured to control the transceiver (106) to transmit the generated MAC CE to the second wireless device.

According to some embodiments of the present disclosure, the processor 102 may be configured to control the transceiver to receive a second request for a second SL CSI reporting from the third wireless device.

The processor 102 may be configured to trigger the second SL CSI reporting for a second pair of a Source ID for the first wireless device and a Destination ID for the third wireless device, wherein the second pair is corresponding to the second PC5-RRC connection.

The processor 102 may be configured to maintain the triggered second SL CSI reporting for the second pair while cancelling the triggered first SL CSI reporting for the first pair.

According to some embodiments of the present disclosure, the processor 102 may be configured to start a timer related to the first SL CSI reporting upon triggering the first SL CSI reporting.

The processor 102 may be configured to cancel the triggered first SL CSI reporting upon expiry of the timer.

For example, the timer may be configured for each pair of a Source ID and a Destination ID corresponding to a PC5-RRC connection.

According to some embodiments of the present disclosure, the first request for the first SL CSI reporting may include a Sidelink Control Information transmitted via a Physical Sidelink Control Channel (PSCCH) and/or a Physical Sidelink Shared Channel (PSSCH).

According to some embodiments of the present disclosure, the generated MAC CE may include a Channel Quality Indicator (CQI) for the first PC5-RRC connection.

According to some embodiments of the present disclosure, the processor 102 may be configured to control the transceiver (106) to receive a third request for a third SL CSI reporting from the second wireless device.

The processor 102 may be configured to trigger the third SL CSI reporting for a third pair of a Source ID for the first wireless device and a Destination ID for the second wireless device. The third pair may be corresponding to the first PC5-RRC connection.

For example, the Source ID for the first wireless device and/or the Destination ID for the second wireless device included in the first pair may be different from the Source ID for the first wireless device and/or the Destination ID for the second wireless device included in the third pair.

The processor 102 may be configured to maintain the triggered third SL CSI reporting for the third pair while cancelling the triggered first SL CSI reporting for the first pair.

According to some embodiments of the present disclosure, the processor 102 may be configured to be in communication with at least one of a user equipment, a network, or an autonomous vehicle other than the first wireless device.

Hereinafter, a processor for a first wireless device for cancelling sidelink (SL) channel state information (CSI)

reporting in a wireless communication system, according to some embodiments of the present disclosure, will be described.

The processor may be configured to establish a first PC5-Radio Resource Control (RRC) connection with a second wireless device and a second PC5-RRC connection with a third wireless device. The processor may be configured to receive a first request for a first sidelink (SL) Channel State Information (CSI) reporting from the second wireless device. The processor may be configured to trigger the first SL CSI reporting for a first pair of a Source ID for the first wireless device and a Destination ID for the second wireless device. The first pair may be corresponding to the first PC5-RRC connection. The processor may be configured to generate a MAC CE for the first SL CSI reporting. The processor may be configured to cancel the triggered first SL CSI reporting for the first pair. The processor may be configured to transmit the generated MAC CE to the second wireless device.

According to some embodiments of the present disclosure, the processor may be configured to control the transceiver to receive a second request for a second SL CSI reporting from the third wireless device.

The processor may be configured to trigger the second SL CSI reporting for a second pair of a Source ID for the first wireless device and a Destination ID for the third wireless device, wherein the second pair is corresponding to the second PC5-RRC connection.

The processor may be configured to maintain the triggered second SL CSI reporting for the second pair while cancelling the triggered first SL CSI reporting for the first pair.

According to some embodiments of the present disclosure, the processor may be configured to start a timer related to the first SL CSI reporting upon triggering the first SL CSI reporting.

The processor may be configured to cancel the triggered first SL CSI reporting upon expiry of the timer.

For example, the timer may be configured for each pair of a Source ID and a Destination ID corresponding to a PC5-RRC connection.

According to some embodiments of the present disclosure, the first request for the first SL CSI reporting may include a Sidelink Control Information transmitted via a Physical Sidelink Control Channel (PSCCH) and/or a Physical Sidelink Shared Channel (PSSCH).

According to some embodiments of the present disclosure, the generated MAC CE may include a Channel Quality Indicator (CQI) for the first PC5-RRC connection.

According to some embodiments of the present disclosure, the processor may be configured to receive a third request for a third SL CSI reporting from the second wireless device.

The processor may be configured to trigger the third SL CSI reporting for a third pair of a Source ID for the first wireless device and a Destination ID for the second wireless device. The third pair may be corresponding to the first PC5-RRC connection.

For example, the Source ID for the first wireless device and/or the Destination ID for the second wireless device included in the first pair may be different from the Source ID for the first wireless device and/or the Destination ID for the second wireless device included in the third pair.

The processor may be configured to maintain the triggered third SL CSI reporting for the third pair while cancelling the triggered first SL CSI reporting for the first pair.

According to some embodiments of the present disclosure, the processor may be configured to control the first wireless device to be in communication with at least one of a user equipment, a network, or an autonomous vehicle other than the first wireless device.

Hereinafter, a non-transitory computer-readable medium has stored thereon a plurality of instructions for cancelling sidelink (SL) channel state information (CSI) reporting in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a first wireless device.

The stored a plurality of instructions may cause the first wireless device to establish a first PC5-Radio Resource Control (RRC) connection with a second wireless device and a second PC5-RRC connection with a third wireless device. The stored a plurality of instructions may cause the first wireless device to receive a first request for a first sidelink (SL) Channel State Information (CSI) reporting from the second wireless device. The stored a plurality of instructions may cause the first wireless device to trigger the first SL CSI reporting for a first pair of a Source ID for the first wireless device and a Destination ID for the second wireless device. The first pair may be corresponding to the first PC5-RRC connection. The stored a plurality of instructions may cause the first wireless device to generate a MAC CE for the first SL CSI reporting. The stored a plurality of instructions may cause the first wireless device to cancel the triggered first SL CSI reporting for the first pair. The stored a plurality of instructions may cause the first wireless device to transmit the generated MAC CE to the second wireless device.

According to some embodiments of the present disclosure, the stored a plurality of instructions may cause the first wireless device to control the transceiver to receive a second request for a second SL CSI reporting from the third wireless device.

The stored a plurality of instructions may cause the first wireless device to trigger the second SL CSI reporting for a second pair of a Source ID for the first wireless device and a Destination ID for the third wireless device, wherein the second pair is corresponding to the second PC5-RRC connection.

The stored a plurality of instructions may cause the first wireless device to maintain the triggered second SL CSI reporting for the second pair while cancelling the triggered first SL CSI reporting for the first pair.

According to some embodiments of the present disclosure, the stored a plurality of instructions may cause the first wireless device to start a timer related to the first SL CSI reporting upon triggering the first SL CSI reporting.

The stored a plurality of instructions may cause the first wireless device to cancel the triggered first SL CSI reporting upon expiry of the timer.

For example, the timer may be configured for each pair of a Source ID and a Destination ID corresponding to a PC5-RRC connection.

According to some embodiments of the present disclosure, the first request for the first SL CSI reporting may include a Sidelink Control Information transmitted via a Physical Sidelink Control Channel (PSCCH) and/or a Physical Sidelink Shared Channel (PSSCH).

According to some embodiments of the present disclosure, the generated MAC CE may include a Channel Quality Indicator (CQI) for the first PC5-RRC connection.

According to some embodiments of the present disclosure, the stored a plurality of instructions may cause the first wireless device to receive a third request for a third SL CSI reporting from the second wireless device.

The stored a plurality of instructions may cause the first wireless device to trigger the third SL CSI reporting for a third pair of a Source ID for the first wireless device and a Destination ID for the second wireless device. The third pair may be corresponding to the first PC5-RRC connection.

For example, the Source ID for the first wireless device and/or the Destination ID for the second wireless device included in the first pair may be different from the Source ID for the first wireless device and/or the Destination ID for the second wireless device included in the third pair.

The stored a plurality of instructions may cause the first wireless device to maintain the triggered third SL CSI reporting for the third pair while cancelling the triggered first SL CSI reporting for the first pair.

According to some embodiments of the present disclosure, the stored a plurality of instructions may cause the first wireless device to be in communication with at least one of a user equipment, a network, or an autonomous vehicle other than the first wireless device.

Hereinafter, a method for cancelling sidelink (SL) channel state information (CSI) reporting performed by a second wireless device (for example, RX UE) in a wireless communication system, according to some embodiments of the present disclosure, will be described.

The second wireless device may establish a first PC5-Radio Resource Control (RRC) connection with a first wireless device.

The second wireless device may transmit, to a first wireless device, a first request for a first sidelink (SL) Channel State Information (CSI) reporting.

The second wireless device may receive, from the first wireless device, a MAC CE for the first SL CSI reporting.

Hereinafter, a second wireless device (for example, RX UE) for cancelling sidelink (SL) channel state information (CSI) reporting in a wireless communication system, according to some embodiments of the present disclosure, will be described.

The second wireless device may include a transceiver, a memory, and a processor operatively coupled to the transceiver and the memory.

The processor may be configured to establish a first PC5-Radio Resource Control (RRC) connection with a first wireless device. The processor may be configured to control the transceiver to transmit, to a first wireless device, a first request for a first sidelink (SL) Channel State Information (CSI) reporting. The processor may be configured to control the transceiver to receive, from the first wireless device, a MAC CE for the first SL CSI reporting.

The present disclosure can have various advantageous effects.

According to some embodiments of the present disclosure, a wireless device could cancel sidelink (SL) channel state information (CSI) reporting in a wireless communication system efficiently.

For example, a wireless device could save resource by cancelling the SL CSI reporting in a SL CSI reporting procedure.

For example, a wireless communication system could properly provide resource management by cancel sidelink (SL) channel state information (CSI) reporting in a wireless communication system.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Figure 15:
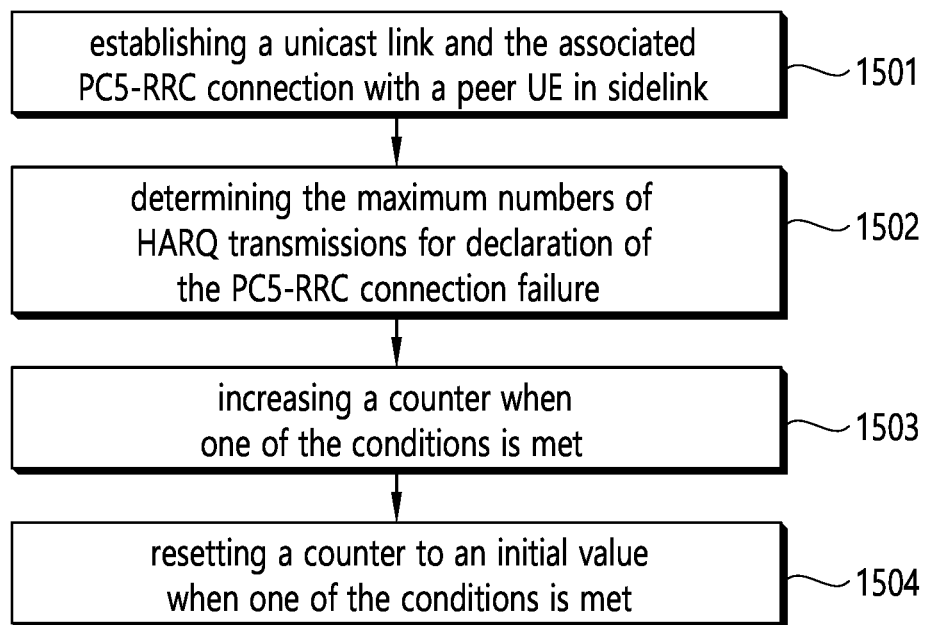
FIG. 15 shows an example of a method for performing data transmission by a UE to which the technical features of the present disclosure can be applied.

FIG. 15 shows an example of a method for performing data transmission by a UE to which the technical features of the present disclosure can be applied.

In step 1501, UE may establish a unicast link and the associated PC5-RRC connection with a peer UE in sidelink.

In step 1502, UE may determine the maximum numbers of HARQ transmissions for declaration of the PC5-RRC connection failure.

For example, the maximum numbers of HARQ transmissions for declaration of the PC5-RRC connection failure may be configured by the network or the peer UE.

For other example, UE may determine the maximum numbers of HARQ transmissions for declaration of the PC5-RRC connection failure based on the QoS parameters of logical channels belonging to the PC5-RRC connection or the unicast link.

In step 1503, UE may increase a counter when one of the following conditions is met:
 if no acknowledgement to a transmission of any MAC PDU (e.g. HARQ feedback) has been received; and/or
 if a negative acknowledgement to a transmission of any MAC PDU has been received.

In step 1504, UE may reset a counter to an initial value (e.g. zero) when one of the following conditions is met:
- if a parameter related to establishment of a PC5-RRC connection or PC5-S unicast link is indicated by upper layers; and/or
- if a very first new transmission is triggered by this sidelink HARQ entity for the PC5-RRC connection; and/or
- if N acknowledgements (for example, HARQ feedbacks) have been received either consecutively or within an interval.

Figure 16:
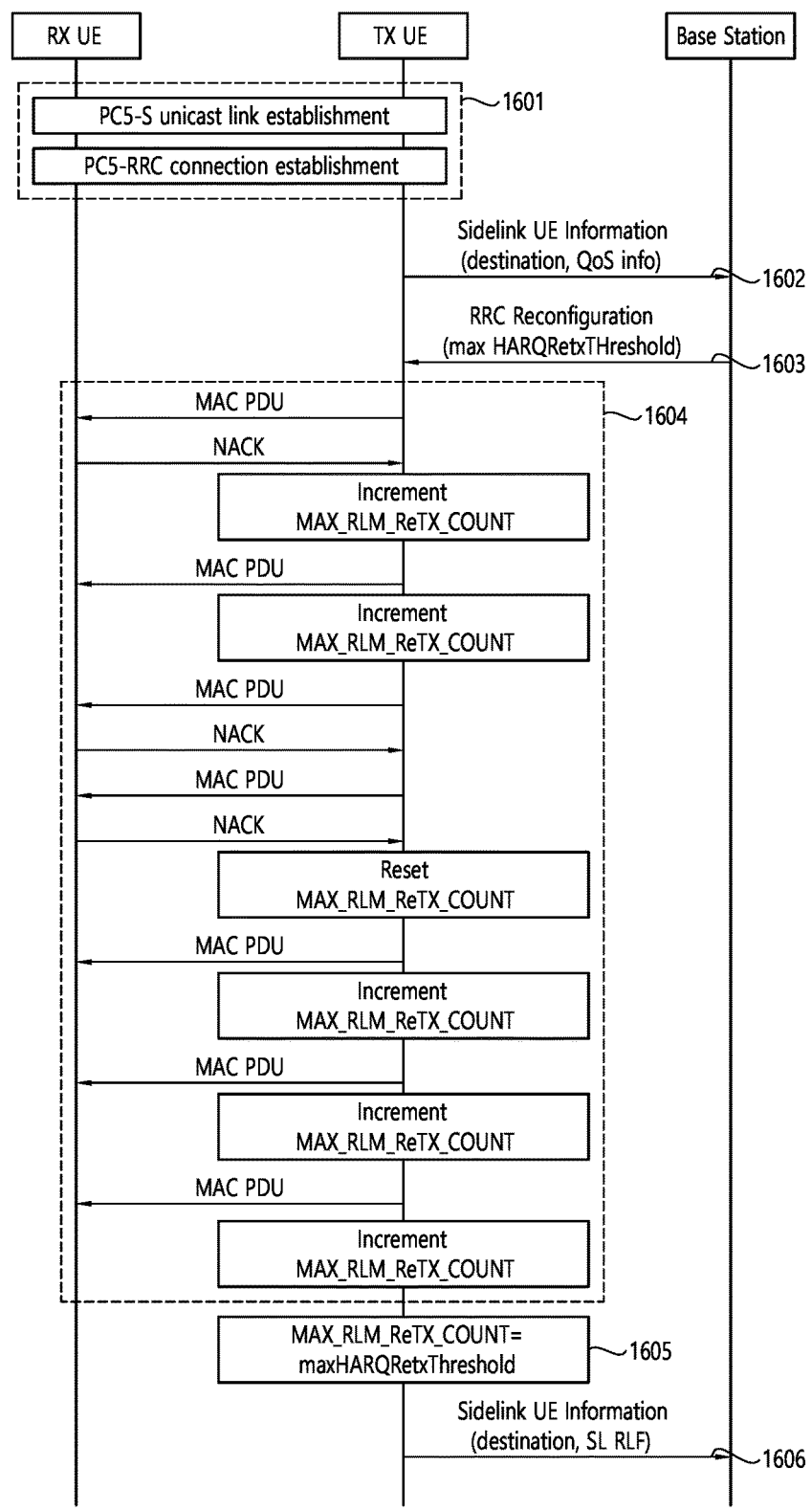
FIG. 16 shows an example of method for sidelink HARQ transmissions and failure detection from a UE in a wireless communication system, according to some embodiments of the present disclosure.

FIG. 16 shows an example of method for sidelink HARQ transmissions and failure detection from a UE in a wireless communication system, according to some embodiments of the present disclosure.

In particular FIG. 16 shows an example of sidelink HARQ transmissions and failure detection from a UE to which the technical features of the present disclosure can be applied.

It is clear that present disclosure is not limited thereto. The present disclosure could be applied to quality reporting for uplink data transmission as well.

In step 1601, TX UE may establish a PC5-S unicast link and the associated PC5-RRC connection with RX UE.

In step 1602, TX UE may send Sidelink UE information indicating the destination ID of the RX UE to the network. TX UE may indicate the destination ID and the associated QoS information to the network via the Sidelink UE Information. The destination ID may be associated to a destination index according to the contents of the Sidelink UE Information.

In step 1603, upon receiving the Sidelink UE information, the network may send RRC Reconfiguration message to the TX UE. The message may include N value and maxHARQRetxThreshold with the destination index.

In TX UE, the Sidelink HARQ Entity may maintain an N value, maxHARQRetxThreshold and MAX_RLM_ReTX_COUNT for each PC5-RRC connection that has established by RRC (or for each PC5-S unicast link established by PC5-S entity, each destination or each pair of a Source Layer-2 ID and a Destination Layer-2 ID).

The N value and maxHARQRetxThreshold may be configured by RRC for the PC5-RRC connection (or the PC5-S unicast link established by PC5-S entity, the destination or the pair of a Source Layer-2 ID and a Destination Layer-2 ID).

The Sidelink HARQ Entity may correspond both receiving and transmitting Sidelink HARQ Entity or either receiving or transmitting Sidelink HARQ Entity.

The maxHARQRetxThreshold may be configured with the value of the maxHARQRetxThreshold configured for the logical channel with the highest priority belonging to the PC5-RRC connection or with the lowest, an average or highest value of all maxHARQRetxThreshold values configured for all logical channels belonging to the PC5-RRC connection (or the PC5-S unicast link established by PC5-S entity, the destination or the pair of a Source Layer-2 ID and a Destination Layer-2 ID).

The N value may be configured with the value of the N value configured for the logical channel with the highest priority belonging to the PC5-RRC connection or with the lowest, an average or highest value of all N values configured for all logical channels belonging to the PC5-RRC connection (or the PC5-S unicast link established by PC5-S entity, the destination or the pair of a Source Layer-2 ID and a Destination Layer-2 ID).

The Sidelink HARQ Entity in TX UE may set the MAX_RLM_ReTX_COUNT to zero for each PC5-RRC connection that has established by RRC (or for each PC5-S unicast link established by PC5-S entity, each destination or each pair of a Source Layer-2 ID and a Destination Layer-2 ID), when one of the following conditions is met:
- if maxHARQRetxThreshold is configured by RRC (for example, initial step of HARQ based RLM e.g. upon establishment of a PC5-RRC connection or PC5-S unicast link); and/or
- if a parameter related to establishment of a PC5-RRC connection or PC5-S unicast link is indicated by upper layers; and/or
- if a very first new transmission is triggered by this sidelink HARQ entity for the PC5-RRC connection (or the PC5-S unicast link established by PC5-S entity, the destination or the pair of a Source Layer-2 ID and a Destination Layer-2 ID); and/or
- if N acknowledgements have been received on PSFCH either consecutively or in an interval (Wherein N can be one or more):
  - The N acknowledgements may correspond to only positive acknowledgements successfully received on PSFCH; and/or
  - The N acknowledgements may correspond to only negative acknowledgements successfully received on PSFCH; and/or
  - The N acknowledgements may correspond to both positive and negative acknowledgements successfully received on PSFCH; and/or
  - The N acknowledgements may not include unsuccessful reception of any acknowledgement on PSFCH (for example, either no HARQ feedback transmission of an acknowledgement from a peer UE (for example, because the peer UE does not successfully receive the corresponding PSCCH and/or PSSCH) or no reception of HARQ feedback transmission from a peer UE (for example, because this UE does not successfully receive the corresponding PSFCH).

In step 1604, the Sidelink HARQ Entity in TX UE may increment the MAX_RLM_ReTX_COUNT for each PC5-RRC connection that has established by RRC (or for each PC5-S unicast link established by PC5-S entity, each destination or each pair of a Source Layer-2 ID and a Destination Layer-2 ID), when one of the following conditions is met:
- if no acknowledgement to a transmission of any MAC PDU has been received on PSFCH; and/or
- Option 1: the acknowledgement may only correspond to a positive acknowledgement successfully received on PSFCH;
- Option 2: the acknowledgement may only correspond to a negative acknowledgement successfully received on PSFCH;
- Option 3: the acknowledgement may only correspond to either a positive or a negative acknowledgement successfully received on PSFCH;
- if a negative acknowledgement to a transmission of any MAC PDU has been received on PSFCH.

In step 1605, if MAX_RLM_ReTX_COUNT reaches maxHARQRetxThreshold, the MAC entity in TX UE may indicate to RRC that max HARQ retransmission has been reached for each PC5-RRC connection that has established by RRC (or for each PC5-S unicast link established by PC5-S entity, each destination or each pair of a Source Layer-2 ID and a Destination Layer-2 ID)

In step 1606, upon receiving this indication from the MAC entity, TX UE RRC may declare sidelink radio link failure on the corresponding PC5-RRC connection (or the corresponding pair or the corresponding destination) and indicate sidelink radio link failure to the network.

According to some embodiments of the present disclosure, the UL transmissions and SL transmissions could be performed for different RATs or the same RAT.

The present disclosure could be also applied to radio link failure of different uplink transmissions to different base stations, for example, configured for dual connectivity or carrier aggregation in uplink. In this case, the TX UE in FIG. 16 can be replaced by the same or a different base station.

The present disclosure may be applied to various future technologies, such as AI.

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 17:
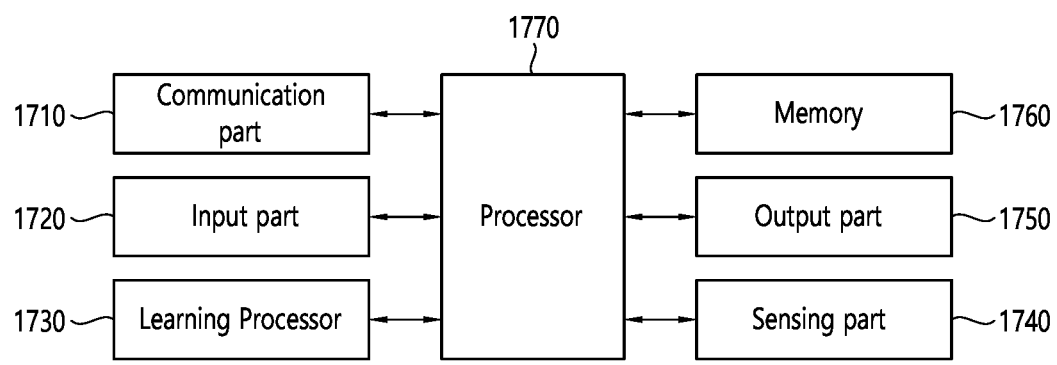
FIG. 17 shows an example of an AI device to which the technical features of the present disclosure can be applied.

FIG. 17 shows an example of an AI device to which the technical features of the present disclosure can be applied.

The AI device 1700 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 17, the AI device 1700 may include a communication part 1710, an input part 1720, a learning processor 1730, a sensing part 1740, an output part 1750, a memory 1760, and a processor 1770.

The communication part 1710 can transmit and/or receive data to and/or from external devices such as the AI devices and the AI server using wire and/or wireless communication technology. For example, the communication part 1710 can transmit and/or receive sensor information, a user input, a learning model, and a control signal with external devices. The communication technology used by the communication part 1710 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1720 can acquire various kinds of data. The input part 1720 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1720 can acquire input data to be used when acquiring an output using learning data and a learning model for model learning. The input part 1720 may obtain raw input data, in which case the processor 1770 or the learning processor 1730 may extract input features by preprocessing the input data.

The learning processor 1730 may learn a model composed of an ANN using learning data. The learned ANN can be referred to as a learning model. The learning model can be used to infer result values for new input data rather than learning data, and the inferred values can be used as a basis for determining which actions to perform. The learning processor 1730 may perform AI processing together with the learning processor of the AI server. The learning processor 1730 may include a memory integrated and/or implemented in the AI device 1700. Alternatively, the learning processor 1730 may be implemented using the memory 1760, an external memory directly coupled to the AI device 1700, and/or a memory maintained in an external device.

The sensing part 1740 may acquire at least one of internal information of the AI device 1700, environment information of the AI device 1700, and/or the user information using various sensors. The sensors included in the sensing part 1740 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1750 may generate an output related to visual, auditory, tactile, etc. The output part 1750 may include a display unit for outputting visual information, a speaker for outputting auditory information, and/or a haptic module for outputting tactile information.

The memory 1760 may store data that supports various functions of the AI device 1700. For example, the memory 1760 may store input data acquired by the input part 1720, learning data, a learning model, a learning history, etc.

The processor 1770 may determine at least one executable operation of the AI device 1700 based on information determined and/or generated using a data analysis algorithm and/or a machine learning algorithm. The processor 1770 may then control the components of the AI device 1700 to perform the determined operation. The processor 1770 may request, retrieve, receive, and/or utilize data in the learning processor 1730 and/or the memory 1760, and may control the components of the AI device 1700 to execute the predicted operation and/or the operation determined to be desirable among the at least one executable operation. The processor 1770 may generate a control signal for controlling the external device, and may transmit the generated control signal to the external device, when the external device needs to be linked to perform the determined operation. The processor 1770 may obtain the intention information for the user input and determine the user's requirements based on the obtained intention information. The processor 1770 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1730 and/or learned by the learning processor of the AI server, and/or learned by their distributed processing. The processor 1770 may collect history information including the operation contents of the AI device 1700 and/or the user's feedback on the operation, etc. The processor 1770 may store the collected history information in the memory 1760 and/or the learning processor 1730, and/or transmit to an external device such as the AI server. The collected history information can be used to update the learning model. The processor 1770 may control at least some of the components of AI device 1700 to drive an application program stored in memory 1760. Furthermore, the processor 1770 may operate two or more of the components included in the AI device 1700 in combination with each other for driving the application program.

Figure 18:
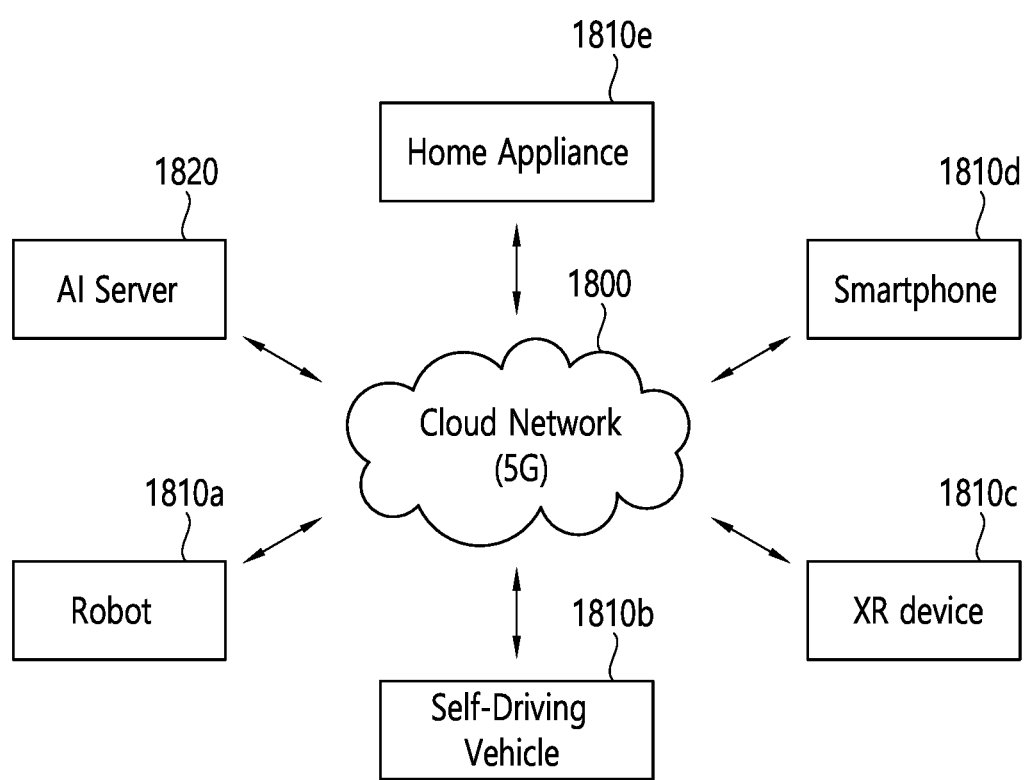
FIG. 18 shows an example of an AI system to which the technical features of the present disclosure can be applied.

FIG. 18 shows an example of an AI system to which the technical features of the present disclosure can be applied.

Referring to FIG. 18, in the AI system, at least one of an AI server 1820, a robot 1810a, an autonomous vehicle 1810b, an XR device 1810c, a smartphone 1810d and/or a home appliance 1810e is connected to a cloud network 1800. The robot 1810a, the autonomous vehicle 1810b, the XR device 1810c, the smartphone 1810d, and/or the home appliance 1810e to which the AI technology is applied may be referred to as AI devices 1810a to 1810e.

The cloud network 1800 may refer to a network that forms part of a cloud computing infrastructure and/or resides in a cloud computing infrastructure. The cloud network 1800 may be configured using a 3G network, a 4G or LTE network, and/or a 5G network. That is, each of the devices 1810a to 1810e and 1820 consisting the AI system may be connected to each other through the cloud network 1800. In particular, each of the devices 1810a to 1810e and 1820 may communicate with each other through a base station, but may directly communicate with each other without using a base station.

The AI server 1820 may include a server for performing AI processing and a server for performing operations on big data. The AI server 1820 is connected to at least one or more of AI devices constituting the AI system, i.e., the robot 1810a, the autonomous vehicle 1810b, the XR device 1810c, the smartphone 1810d and/or the home appliance 1810e through the cloud network 1800, and may assist at least some AI processing of the connected AI devices 1810a to 1810e. The AI server 1820 can learn the ANN according to the machine learning algorithm on behalf of the AI devices 1810a to 1810e, and can directly store the learning models and/or transmit them to the AI devices 1810a to 1810e. The AI server 1820 may receive the input data from the AI devices 1810a to 1810e, infer the result value with respect to the received input data using the learning model, generate a response and/or a control command based on the inferred result value, and transmit the generated data to the AI devices 1810a to 1810e. Alternatively, the AI devices 1810a to 1810e may directly infer a result value for the input data using a learning model, and generate a response and/or a control command based on the inferred result value.

Various embodiments of the AI devices 1810a to 1810e to which the technical features of the present disclosure can be applied will be described. The AI devices 1810a to 1810e shown in FIG. 18 can be seen as specific embodiments of the AI device 1700 shown in FIG. 17.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a first wireless device in a wireless communication system, the method comprising,
   establishing a PC5-Radio Resource Control (RRC) connection with a second wireless device; and
   receiving a Sidelink control information (SCI),
   wherein a sidelink (SL) Channel State Information (CSI) reporting is triggered by the SCI with a CSI request;
   for a first pair of a Source ID and a Destination ID corresponding to the PC5-RRC connection,
      based on that SL CSI reporting has been triggered, and
      based on that (i) a Media Access Control (MAC) entity of the first wireless device has SL resources allocated for new transmission and (ii) the SL resources can accommodate an SL SCI reporting Medium Access Control (MAC) Control Element (CE) and a subheader of the SL SCI reporting MAC CE:
         (1) instructing to generate the SL SCI reporting MAC CE;
         (2) cancelling the triggered SL CSI reporting; and
         (3) triggering the new transmission for a MAC protocol data unit (PDU),
      wherein the generated SL SCI reporting MAC CE is multiplexed in the MAC PDU.

2. The method of claim 1, wherein the method further comprises,
   establishing a PC5-RRC connection with a third wireless device;
   receiving an SCI with a CSI request from the third wireless device; and
   triggering the SL CSI reporting for a second pair of a Source ID for the first wireless device and a Destination ID for the third wireless device, wherein the second pair is corresponding to the PC5-RRC connection.

3. The method of claim 2, wherein the method further comprises,
   maintaining the triggered SL CSI reporting for the second pair while cancelling the triggered SL CSI reporting for the first pair.

4. The method of claim 1, wherein the method further comprises,
   starting a timer related to the SL CSI reporting upon triggering the SL CSI reporting.

5. The method of claim 4, wherein the method further comprises,
   cancelling the triggered SL CSI reporting upon expiry of the timer.

6. The method of claim 4, wherein the timer is configured for each pair of a Source ID and a Destination ID corresponding to a PC5-RRC connection.

7. The method of claim 1, wherein the SCI with the CSI request includes a Sidelink Control Information transmitted via a Physical Sidelink Control Channel (PSCCH) and/or a Physical Sidelink Shared Channel (PSSCH).

8. The method of claim 1, wherein the generated MAC CE includes a Channel Quality Indicator (CQI) for the PC5-RRC connection.

9. The method of claim 1, wherein the method further comprises,
   receiving an additional SCI with a CSI request from the second wireless device; and
   triggering an additional SL CSI reporting for a third pair of a Source ID for the first wireless device and a Destination ID for the second wireless device, wherein the third pair is corresponding to the PC5-RRC connection.

10. The method of claim 9, wherein the Source ID for the first wireless device and/or the Destination ID for the second wireless device included in the first pair is different from the Source ID for the first wireless device and/or the Destination ID for the second wireless device included in the third pair.

11. The method of claim 9, wherein the method further comprises,
    maintaining the triggered SL CSI reporting for the third pair while cancelling the triggered SL CSI reporting for the first pair.

12. The method of claim 1, wherein the first wireless device is in communication with at least one of a user equipment, a network, or an autonomous vehicle other than the first wireless device.

13. A first wireless device in a wireless communication system comprising:
    a transceiver;
    a memory; and
    at least one processor operatively coupled to the transceiver and the memory, and configured to:
    establish a PC5-Radio Resource Control (RRC) connection with a second wireless device; and
    control the transceiver to receive a Sidelink control information (SCI),
    wherein a sidelink (SL) Channel State Information (CSI) reporting is triggered by the SCI with a CSI request;
    for a first pair of a Source ID and a Destination ID corresponding to the PC5-RRC connection,
      based on that SL CSI reporting has been triggered, and
      based on that (i) a Media Access Control (MAC) entity of the first wireless device has SL resources allocated for new transmission and (ii) the SL resources can accommodate an SL SCI reporting Medium Access Control (MAC) Control Element (CE) and a sub-header of the SL SCI reporting MAC CE:
        (1) instruct to generate the SL SCI reporting MAC CE;
        (2) cancel the triggered SL CSI reporting; and
        (3) trigger the new transmission for a MAC protocol data unit (PDU),
        wherein the generated SL SCI reporting MAC CE is multiplexed in the MAC PDU.

14. The first wireless device of claim 13, wherein the at least one processor is further configured to,
    establish a PC5-RRC connection with a third wireless device;
    control the transceiver to receive an SCI with a CSI request from the third wireless device; and
    trigger the SL CSI reporting for a second pair of a Source ID for the first wireless device and a Destination ID for the third wireless device, wherein the second pair is corresponding to the PC5-RRC connection.

15. The first wireless device of claim 14, wherein the at least one processor is further configured to,
    maintain the triggered SL CSI reporting for the second pair while cancelling the triggered SL CSI reporting for the first pair.

16. The first wireless device of claim 13, wherein the at least one processor is further configured to,
    start a timer related to the SL CSI reporting upon triggering the SL CSI reporting.

17. The first wireless device of claim 16, wherein the at least one processor is further configured to,
    cancel the triggered SL CSI reporting upon expiry of the timer.

18. The first wireless device of claim 16, wherein the timer is configured for each pair of a Source ID and a Destination ID corresponding to a PC5-RRC connection.

19. The first wireless device of claim 13, wherein the SCI with the CSI request includes a Sidelink Control Information transmitted via a Physical Sidelink Control Channel (PSCCH) and/or a Physical Sidelink Shared Channel (PSSCH).

20. A non-transitory computer-readable medium having stored thereon a plurality of instructions, which, when executed by a processor of a first wireless device, cause the first wireless device to:
    establish a PC5-Radio Resource Control (RRC) connection with a second wireless device; and
    receive a Sidelink control information (SCI),
    wherein a sidelink (SL) Channel State Information (CSI) reporting is triggered by the SCI with a CSI request;
    for a first pair of a Source ID and a Destination ID corresponding to the PC5-RRC connection,
      based on that SL CSI reporting has been triggered, and
      based on that (i) a Media Access Control (MAC) entity of the first wireless device has SL resources allocated for new transmission and (ii) the SL resources can accommodate an SL SCI reporting Medium Access Control (MAC) Control Element (CE) and a sub-header of the SL SCI reporting MAC CE:
        (1) instruct to generate the SL SCI reporting MAC CE;
        (2) cancel the triggered SL CSI reporting; and
        (3) trigger the new transmission for a MAC protocol data unit (PDU),
        wherein the generated SL SCI reporting MAC CE is multiplexed in the MAC PDU.

\* \* \* \* \*